United States Patent [19]

Nimura et al.

[11] Patent Number: 5,023,728
[45] Date of Patent: Jun. 11, 1991

[54] IMAGE FORMING APPARATUS

[75] Inventors: Mitsuo Nimura; Hideyuki Tanaami, both of Yokohama, Japan

[73] Assignee: Canon Kabushiki Kaisha, Tokyo, Japan

[21] Appl. No.: 382,183

[22] Filed: Jul. 19, 1989

[30] Foreign Application Priority Data

Jul. 20, 1988 [JP] Japan .............................. 63-182552
Oct. 11, 1988 [JP] Japan .............................. 63-256330
Oct. 19, 1988 [JP] Japan .............................. 63-261616

[51] Int. Cl.⁵ ............................................. H04N 1/00
[52] U.S. Cl. .................................. 358/437; 358/451; 358/453; 358/296
[58] Field of Search ................ 358/437, 451, 453, 296

[56] References Cited

U.S. PATENT DOCUMENTS 4,631,596 12/1986 Yaguchi .............................. 358/453
4,731,658 3/1988 Koseki ............................... 358/451
4,905,095 2/1990 Yamada .............................. 358/451
4,947,269 8/1990 Yamada .............................. 358/448

Primary Examiner—Edward L. Coles, Sr.
Attorney, Agent, or Firm—Fitzpatrick, Cella, Harper & Scinto

[57] ABSTRACT

In an image forming apparatus a frame of image data is outputted in a divided manner, and plural images corresponding to the divided image data are recorded in order, respectively on plural recording materials. A manual instruction element is provided for instructing interruption of the image recording operation by the recording means and for re-starting the interrupted image recording operation. A controller controls the image recording operation of the recording means by interrupting the image recording operations in accordance with the interruption instruction and by re-starting the interrupted image recording operation in accordance with the re-start instruction.

12 Claims, 20 Drawing Sheets

FIG. 1B
PRINT PAPER
FIG. 1A
A4 SIZE ORIGINAL
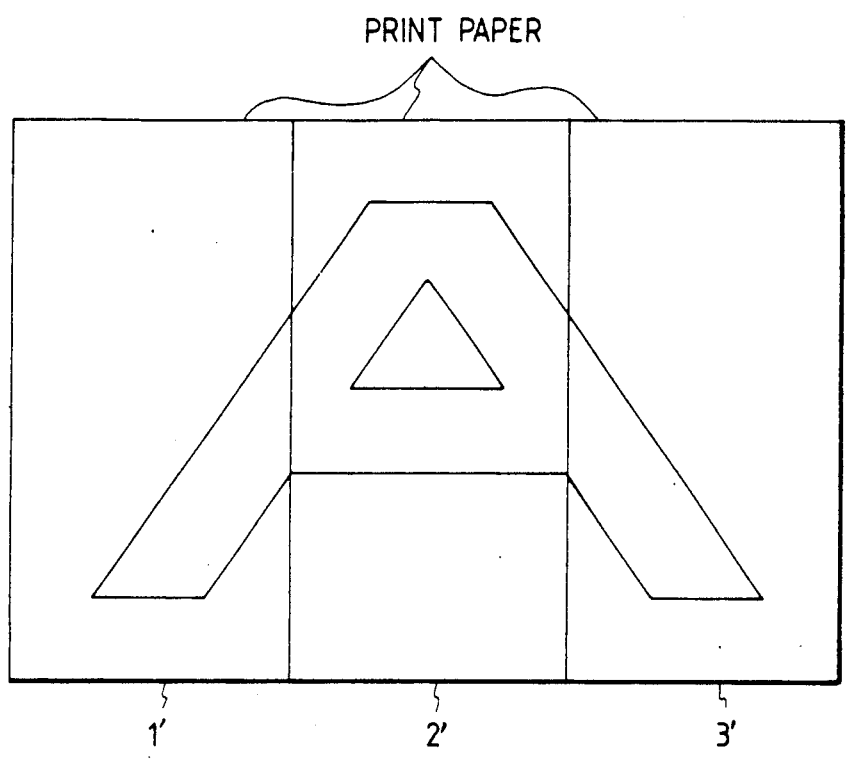
1  2  3
1'  2'  3'
FIG. 2
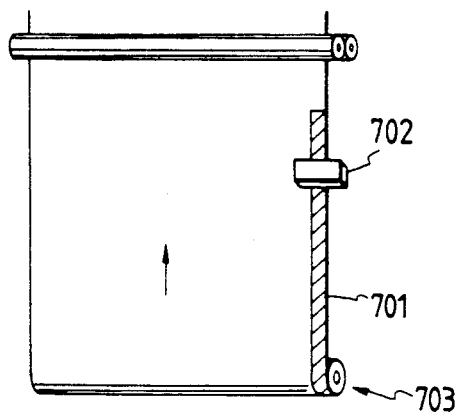

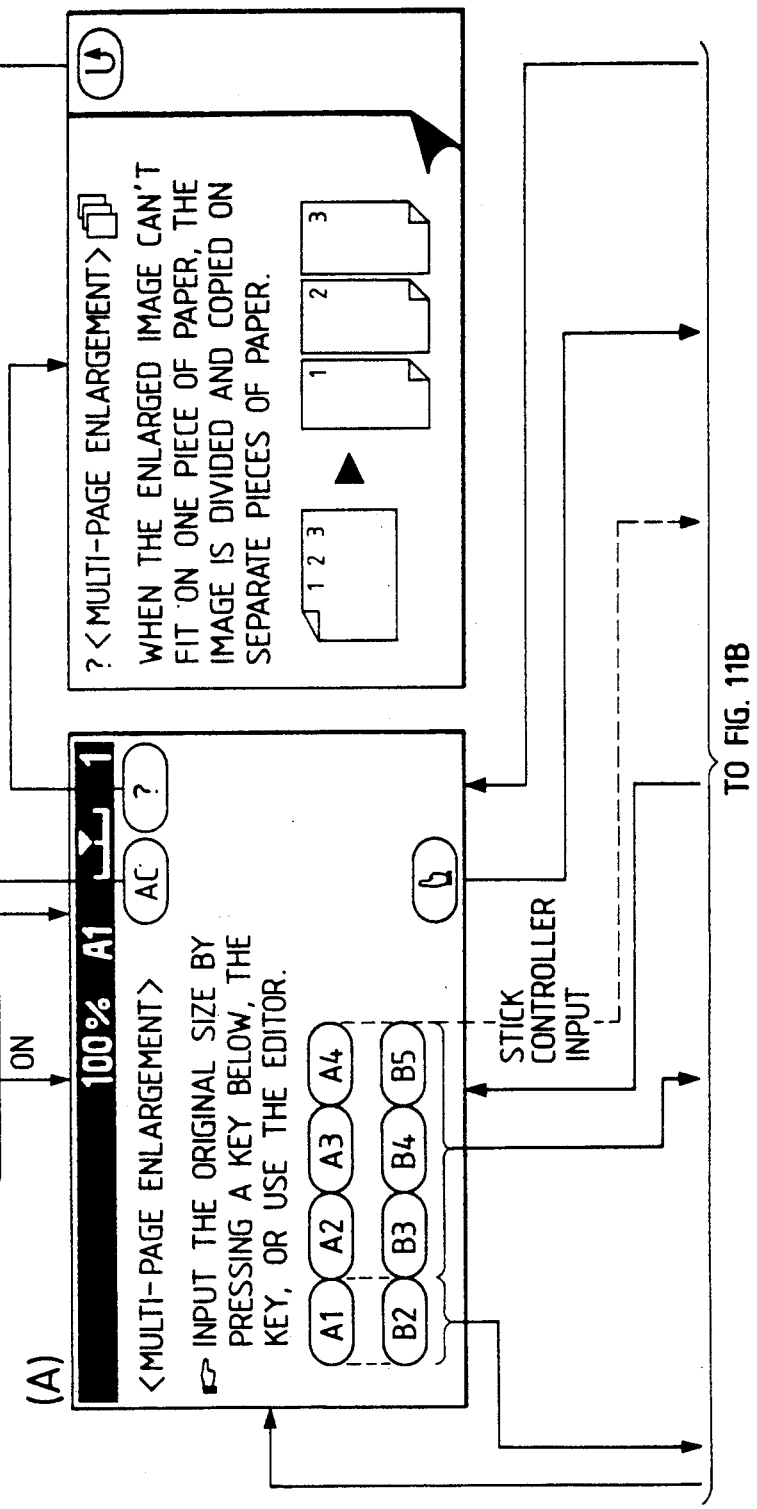

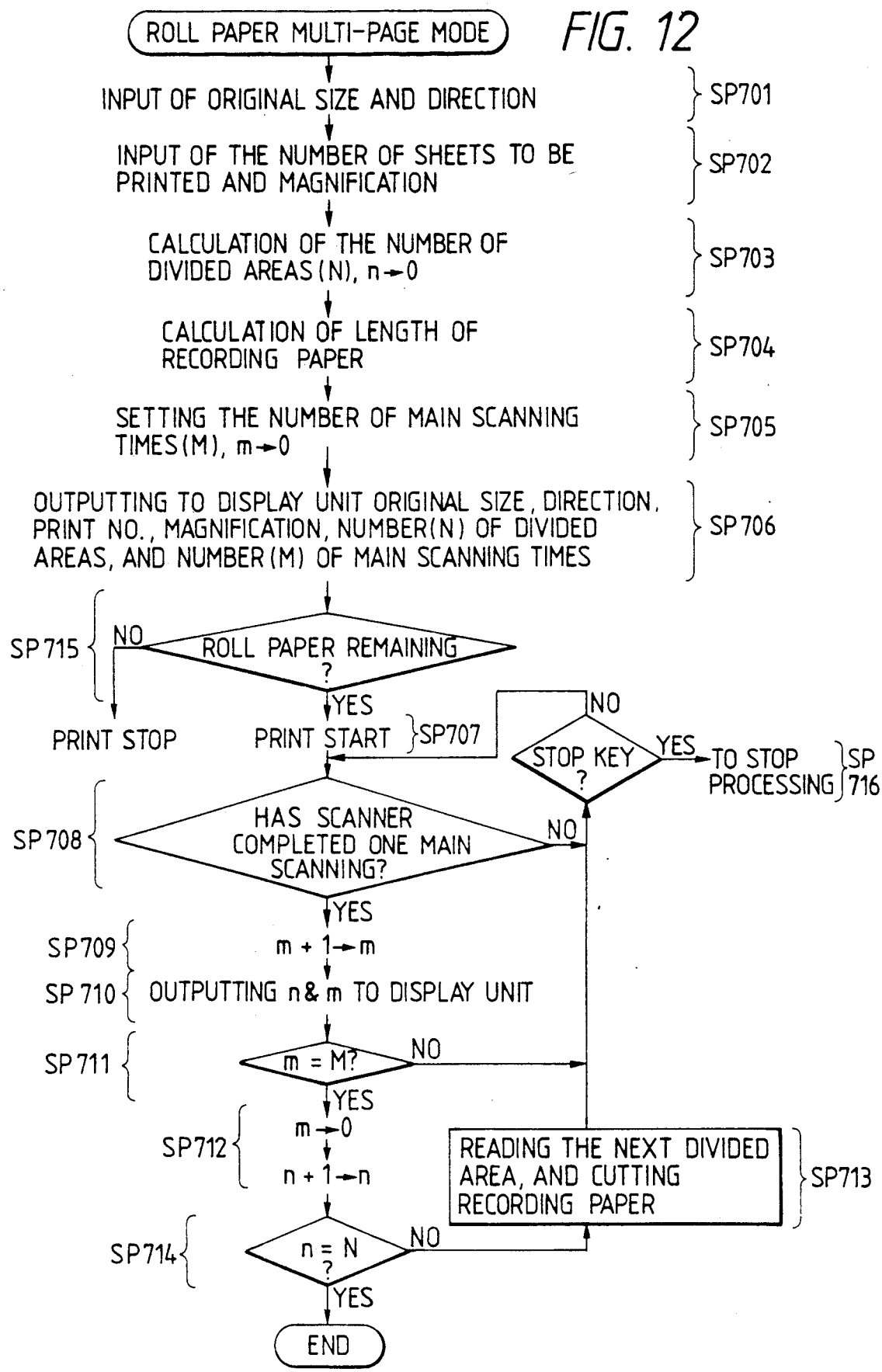

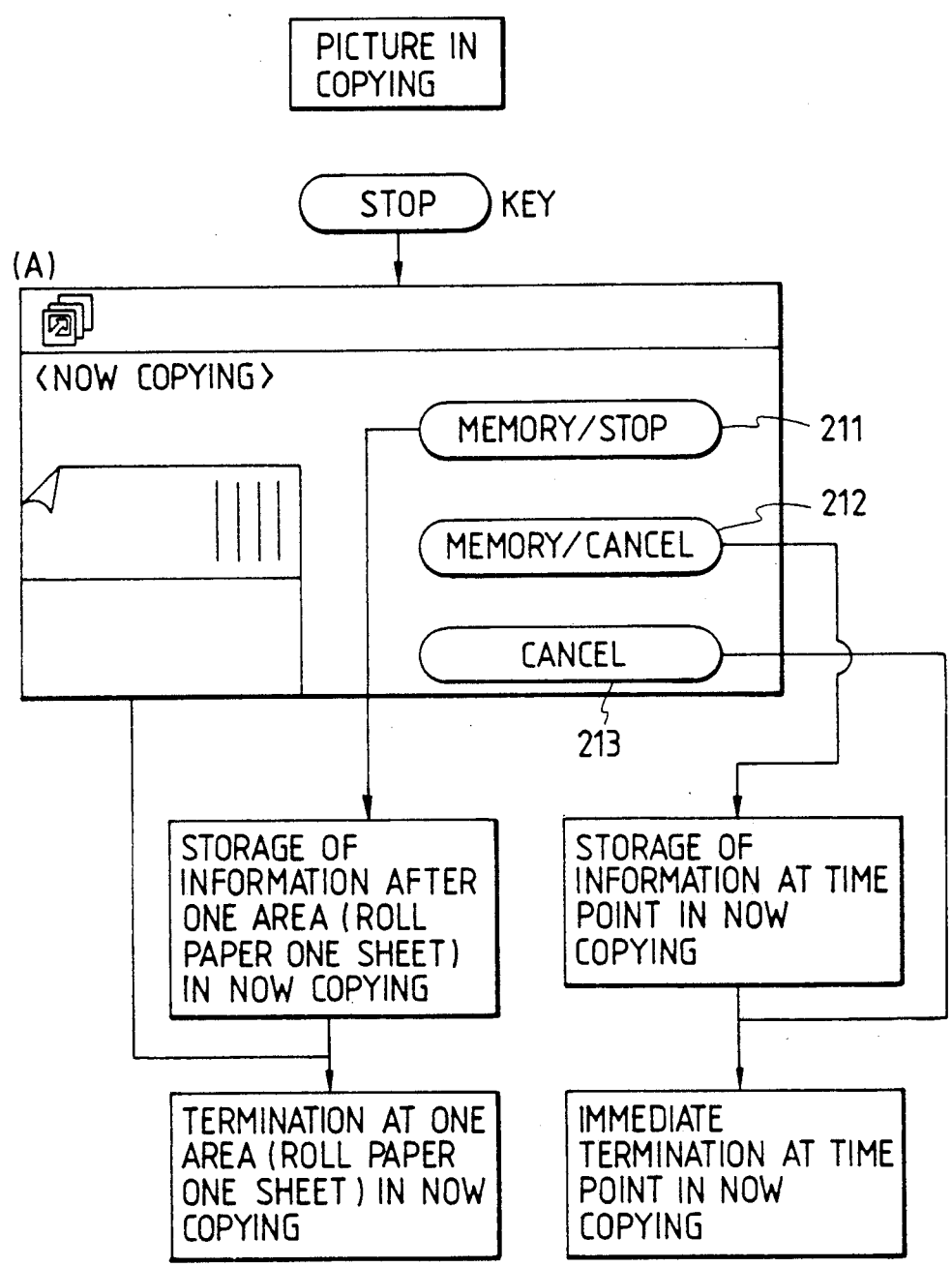

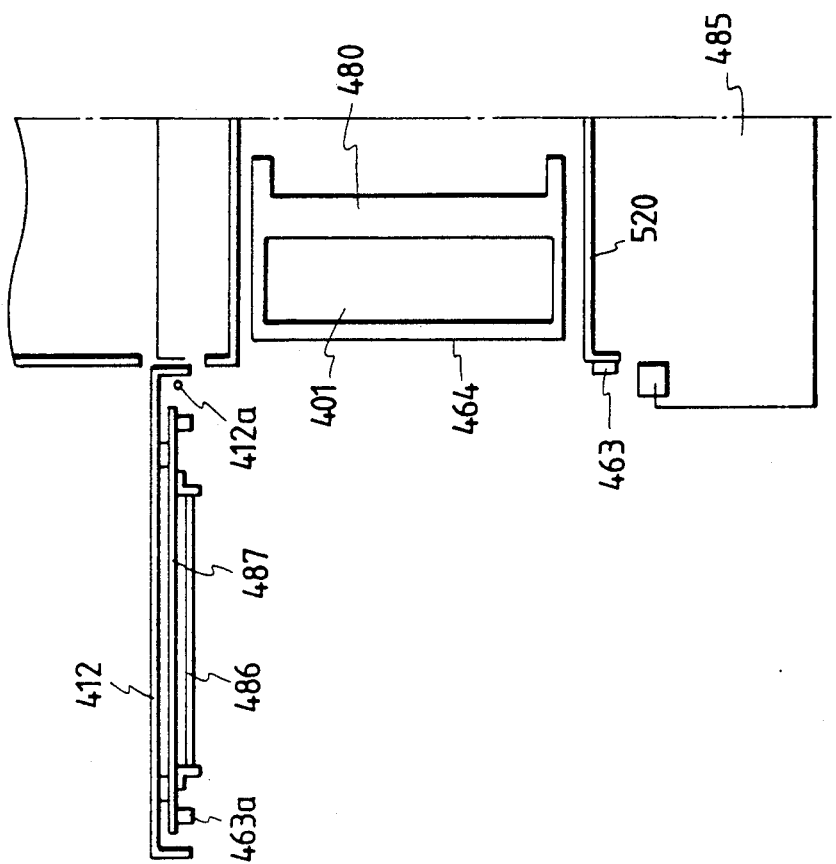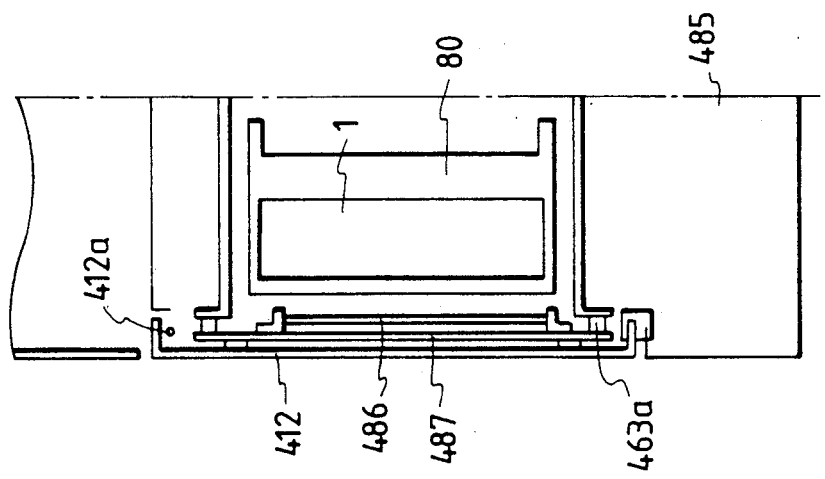

IMAGE FORMING APPARATUS

BACKGROUND OF THE INVENTION

1. Field of the Invention

The present invention relates to an image forming apparatus for forming an image on a recording material.

2. Related Background Art

There are already proposed various digital copying apparatus for reading an original image with an image sensor such as CCD and reproducing said original image on a recording material such as paper, based on the output of said image sensor. Such digital copying apparatuses are easily capable of electrically enlarging the original image with an arbitrary image magnification factor and the present applicant already proposed, in the Japanese patent application Sho No. 62-289182, to record the original image in a size larger than that of the recording material, by dividing the image of a page, by enlarging thus divided images and by recording said images on plural recording sheets.

For example, the copying of an original of A4 size (210×297 mm) with an enlargement ratio of 600% will result in a print of 1260×1782 mm as shown in FIGS. 1A and 1B, wherein FIG. 1A indicates the A4-sized original in laterally oblong position, and FIG. 1B indicates the print with an enlargement ratio of 600%. If the rolled print sheet has a width corresponding to the longer side of A2 size (594 mm), the A4-sized original is divided into three portions (1), (2) and (3) as shown in FIG. 1A, and these portions are respectively copied on print sheets (1'), (2') and (3') as shown in FIG. 1B.

If cut sheets, for example of A3 size, are used in such enlarged printing, there will be required 18 sheets in the above-mentioned example, involving a considerable amount of pasting work for obtaining a single print. On the other hand, the use of a rolled sheet as shown in FIGS. 1A and 1B with an arbitrary amount of sub scanning allows to reduce the number of sheets required and to obtain a larger copy.

However such large-sized copying with rolled sheet requires a very long copying time. Such large-sized copying, if once started, occupies the image forming apparatus (copying machine), excluding other small-sized copying needed urgently. Also if the copying operation is interrupted when the operator has to urgently leave the apparatus or due to the power interruption, the printing operation has to be restarted from the beginning. Also, since such large-sized copying consumes a large amount of rolled sheet, the copying operation may be interrupted if the sheet runs out during the copying operation.

In a conventional printer utilizing a rolled sheet, the rolled sheet 703 bears, as shown in FIG. 2, a striped mark 701 of different reflectivity for example along a lateral edge close to the end portion, and the limited remaining amount of the rolled sheet 703 is identified by detecting said mark 703 with a photosensor 702. When the limited remaining amount of the recording sheet is detected, a corresponding display is made on the display unit of the printer, and the next recording operation is prohibited until the recording sheet is loaded anew.

However, such striped mark for detecting the end of the recording sheet will deteriorate the quality of the recorded image, since said mark remains along the recorded image in the end portion of the sheet. Also after the display of absence of the recording sheet in response to the detection of limited remaining amount thereof, the replacement of the recording sheet is usually identified by the opening/closing of a door of a reservoir housing such recording sheet. However, even if the recording sheet of a small amount is loaded by opening and closing said door, the display for absence of recording sheet is cancelled though the actual amount of the recording sheet is small.

SUMMARY OF THE INVENTION

In consideration of the foregoing, an object of the present invention is to provide an image forming apparatus capable of arbitrarily interrupting and re-starting a large-sized image recording requiring a long time.

Another object of the present invention is to provide an image forming apparatus capable, in case a large-sized copying is not possible, of prohibiting such copying operation in advance instead of interrupting said copying operation, thereby improving the efficiency.

Still another object of the present invention is to provide an image forming apparatus capable of securely detecting the remaining amount of the recording material used in image recording.

Still another object of the present invention is to provide an image forming apparatus capable of securely identifying the replenishment of the recording material used in image recording.

The foregoing and still other objects of the present invention, and the advantages thereof, will become fully apparent from the following description.

BRIEF DESCRIPTION OF THE DRAWINGS

FIGS. 1A and 1B are views showing a large-sized copying in an enlarged continuous copying mode;

FIG. 2 is a schematic view of a conventional method for detecting the remaining amount of rolled sheet;

FIG. 12 is a flow chart showing the control sequence;

FIG. 13 is a chart showing a stop control;

FIGS. 19A and 19B are lateral views of said printer in which a door is in closed and open states;

DESCRIPTION OF THE PREFERRED EMBODIMENTS

Figure 3:
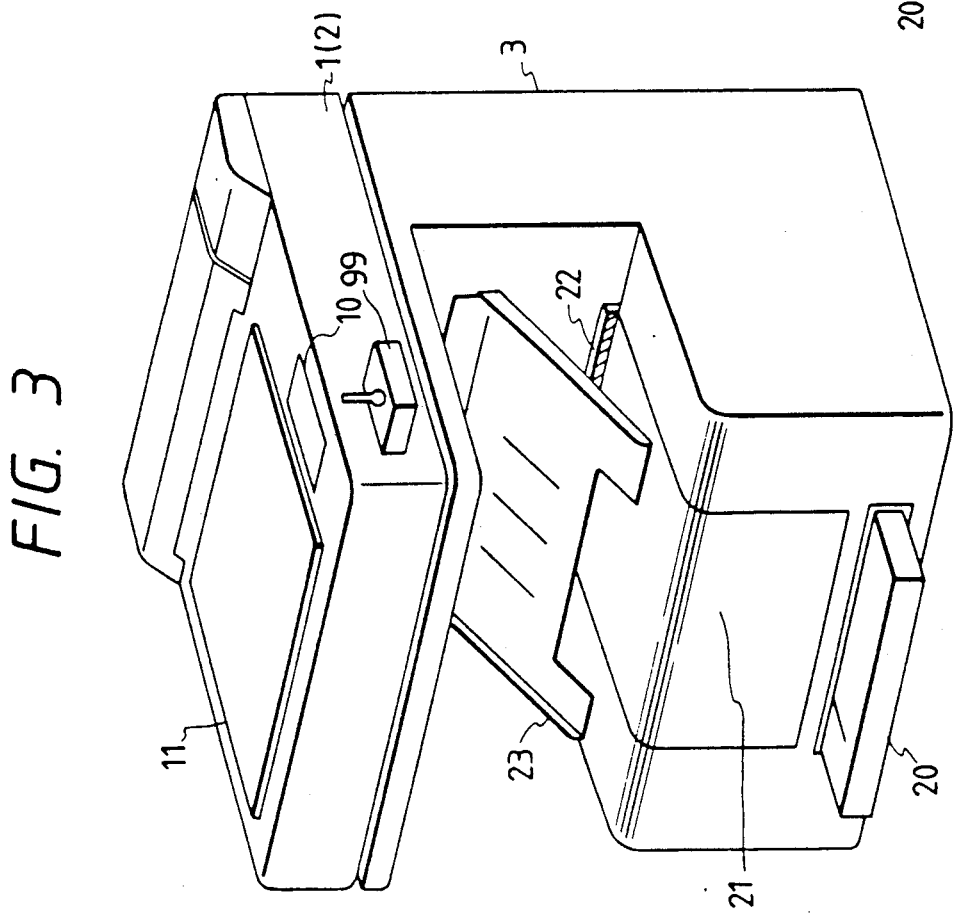
FIG. 3 is an external view of a digital color copying apparatus embodying the present invention.

FIG. 3 is an external view of a digital color copying apparatus embodying the present invention.

The apparatus can be divided into two units.

The upper part of the apparatus shown in FIG. 3 is composed of a color image scanner unit (hereinafter called scanner unit) 1 for reading an original image and generating digital color image data, and a controller unit 2 incorporated in said scanner unit 1, effecting various processings on the digital color image data and functioning as interfaces to external apparatus.

The scanner unit 1 is not only capable of reading a three-dimensional object or a sheet original placed, faced downward under an original cover plate 11, but is also provided with a mechanism for reading a large-sized sheet original.

An operation unit 10 is connected with the controller unit 2 and is used for entering various data. In response to the entered information, the controller unit 2 controls the functions of the functions unit 1 and a printer unit 3. Further complex editing is made possible by replacing the original cover plate 11 with a digitizer and connecting it to the controller unit 2. A stick controller 99 is provided as simple position designating means.

The lower part of the apparatus shown in FIG. 3 is composed of a printer unit 3 for recording a color image on a recording sheet, based on the color digital image signal released from the controller unit 2. In the present embodiment, said printer unit 3 is composed of a full-color ink jet printer utilizing an ink jet recording head disclosed in the Japanese Laid-open patent application Sho No. 54-59936.

The above-mentioned scanner unit 1 and printer unit 3 are mutually separable and can be placed in different positions by extending the connecting cable.

Printer unit

Figure 4:
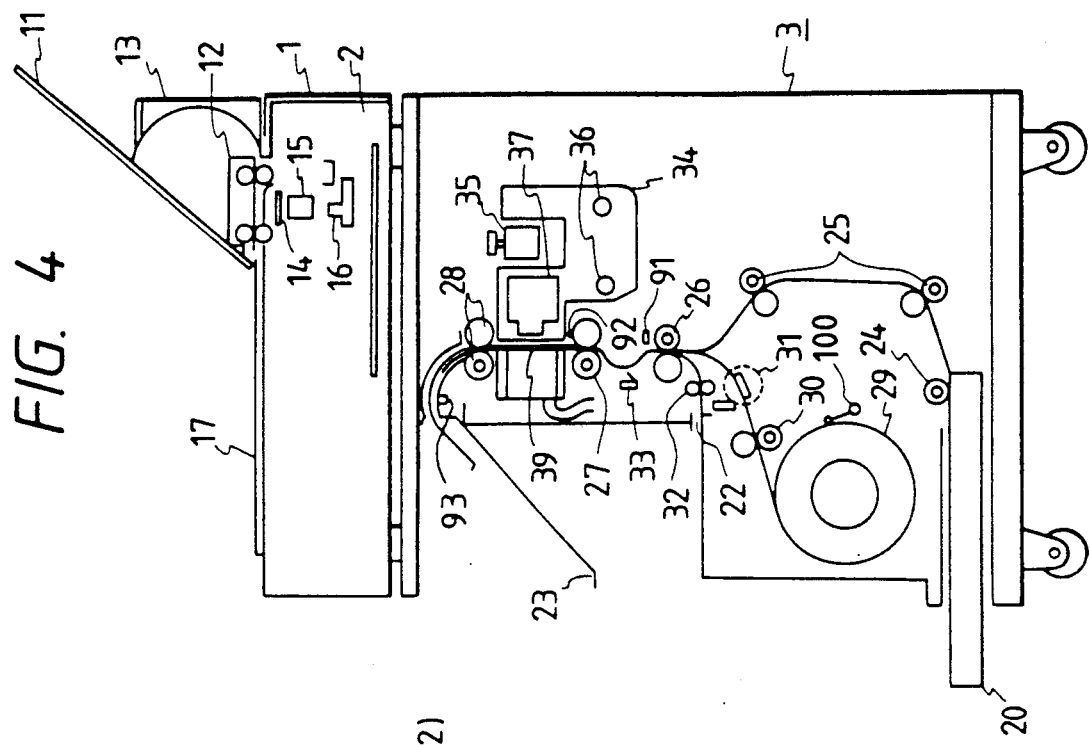
FIG. 4 is a cross-sectional view of the copying apparatus shown in FIG. 3.

FIG. 4 is a lateral cross-sectional view of the digital color copying apparatus shown in FIG. 3.

At first an image of an original placed on an original glass table 17, or a projected image formed by a projector, or an image of a sheet original fed by a sheet feeding mechanism 12, is read by means of an exposure lamp 14, a lens 15 and an image sensor 16 (a CCD in the present embodiment) capable of reading a line image in full colors. Then various image processings are conducted in the scanner unit 1 and the controller unit 2, and the color image is recorded in the printer unit 3 on a recording sheet.

In FIG. 4, the recording sheet is supplied either from a sheet cassette 20 housing cut sheets of small predetermined sizes (A4 to A3 sizes in the present embodiment), or from a rolled sheet 29 for large-size recording (A2 to A1 sizes in the present embodiment).

Also external sheet feeding is possible by manual insertion of recording sheets, one by one, from a manual insertion slot 22 along a cover 21 shown in FIG. 3.

A pickup roller 24 advances cut sheets, one by one, from the sheet cassette 20, and the cut sheet thus fed is transported to first sheet feeding rollers 26 by cut sheet transport rollers 25.

The rolled sheet 29 is advanced by the rolled sheet feeding rollers 30, then cut into a predetermined length by a cutter 31, and is transported to the first sheet feeding rollers 26.

Similarly, the recording sheet inserted from the manual insertion slot 22 is transported by manual insertion rollers 32 to the first sheet feeding rollers 26.

The pickup roller 24, cut sheet transport rollers 25, rolled sheet feeding rollers 30, first sheet feeding rollers 26 and manual insertion rollers 32 are driven by an unrepresented feeding motor (a DC servo motor in the present embodiment), and can be turned on and off by an electromagnetic clutch attached to each roller.

When a printing operation is started by an instruction from the controller unit 2, the recording sheet selectively supplied one of the above-mentioned three paths is transported to the first sheet feeding rollers 26. After formation of a loop of a predetermined amount in order to avoid the skewed transport of the recording sheet, the first feeding rollers 26 are rotated to transport the recording sheet to second sheet feeding rollers 27.

Between the first and second feeding rollers 26, 27, the recording sheet is given a buffer slack of a predetermined amount in order to effect exact sheet feeding between said second feeding rollers 27 and sheet feeding rollers 28. A buffer sensor 33 is provided for detecting the amount of said buffer slack. Constant formation of the buffer slack during the sheet transportation reduces the load on the second sheet feeding rollers 27 and the sheet feeding rollers 28 particularly in case of transporting large-sized sheets, thereby enabling exact sheet feeding.

At the printing operation with the recording head 37, a scanning carriage 34 on which said recording head 37 is mounted reciprocates on carriage rails 36 by means of a scanning motor 35. During the forward motion the image printing is conducted on the recording sheet, and, during backward motion, the recording sheet is advanced by a predetermined amount by a sheet feeding roller 28. During this operation, the above-explained drive system is so controlled that a predetermined amount of buffer slack is maintained, by means of the buffer sensor 33.

The printed sheet is discharged onto a discharge tray 23, and the printing operation is thus completed.

Sheet detectors 91, 92, 93 are respectively provided behind the first feeding rollers 26, second feeding rollers 27 and sheet feeding rollers 28, for detecting the sheet jamming.

A sensor 100 is provided for detecting the remaining amount of the rolled sheet.

Figure 5:
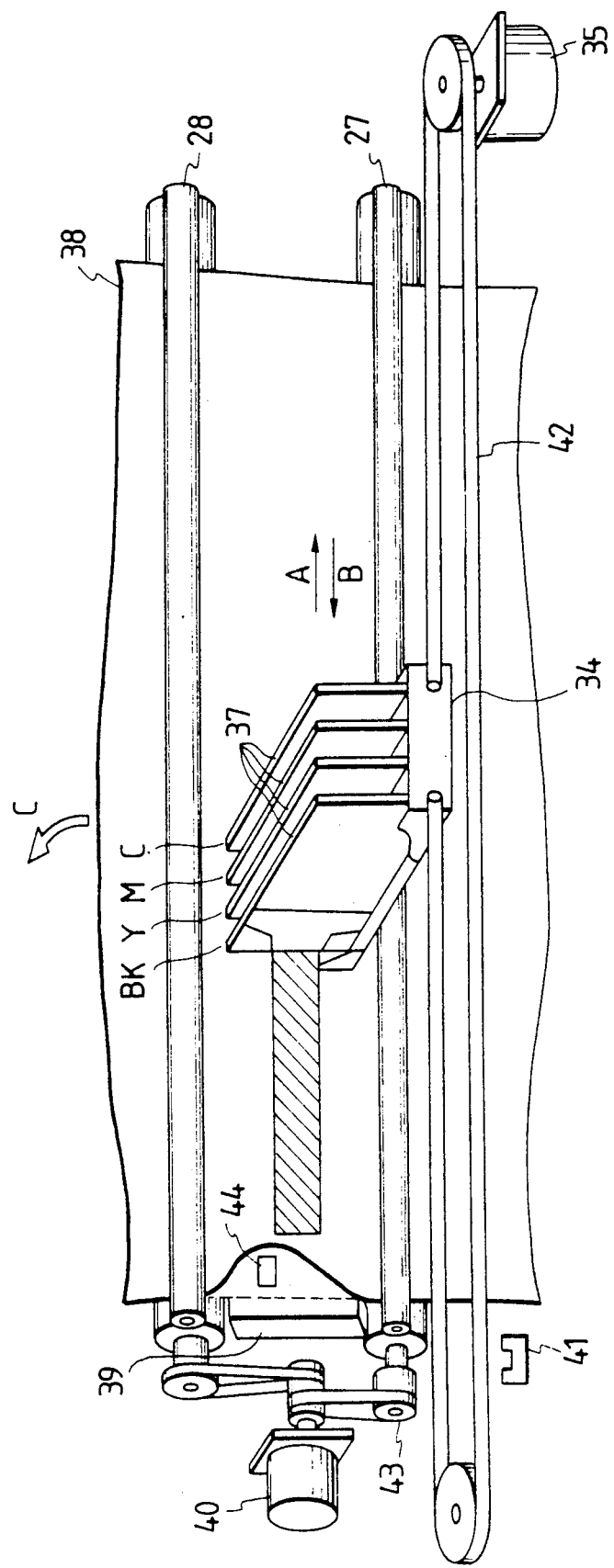
FIG. 5 is a view of a scanning carriage.

Now reference is made to FIG. 5 for explaining the details around the scanning carriage 34.

Referring to FIG. 5, a sheet feeding motor for intermittent feeding of the recording sheet drives the second feeding rollers 27 through the feeding rollers 28 and a second feeding roller clutch 43.

The scanning motor 35 drives the scanning carriage 34 in directions A, B by means of a scanning belt 34. In the present embodiment, for achieving exact sheet feeding control, stepping motors are employed for the motors 40, 35.

When the recording sheet reaches the second feeding rollers 27, the feeding motor 40 and the second sheet feeding roller clutch 43 are turned on to advance the recording sheet to the sheet feeding rollers 28 along a platen 39.

Said recording sheet is detected by a sheet sensor 44 provided on the platen 39, and the output of said sensor is utilized for position control and jamming control.

When the recording sheet reaches the sheet feeding roller 28, the feeding motor 40 and the second sheet feeding roller clutch 43 are turned off, and suction is applied from the inside of the platen 39 by an unrepresented suction motor, thereby maintaining the recording sheet in contact with the platen 39.

Prior to the image recording operation onto the recording sheet, the scanning carriage 34 is moved to the position of a home position sensor 41. Then the scanning carriage 34 is put into forward motion in the direction A, and color inks of cyan C, magenta M, yellow Y and black K are emitted from the recording head 37, starting from a predetermined position, thereby effecting image recording of a predetermined width on the recording sheet. After the image recording of a predetermined length, the scanning carriage 34 is stopped, and is put into backward motion in the direction B to the home position sensor 41. During said backward scanning motion, the recording sheet is advanced in a direction C, by the feeding rollers 28 by the motor 40, by an amount corresponding to the width of the image recorded by the head 37.

In the present embodiment, the recording head 37 is composed of four ink jet nozzles of the aforementioned type, for yellow, magenta, cyan and black, each having 256 nozzles arranged in a direction perpendicular to the moving direction of the scanning carriage.

When the scanning carriage 34 stops at the home position detected by the home position sensor 41, the recovery operation of the recording head 37. This operation is conducted for achieving stable recording operation, and consists of a pressurizing to the recording head 37 or an air emission therefrom according to pre-programmed conditions such as time and temperature, in order to prevent uneven ink emission at the start of ink emission resulting for example from viscosity change in the ink remaining in the nozzles of the head 37.

The above-explained image recording of stripe shape is repeated to effect image recording on the entire surface of the recording sheet.

Scanner unit

Figure 6:
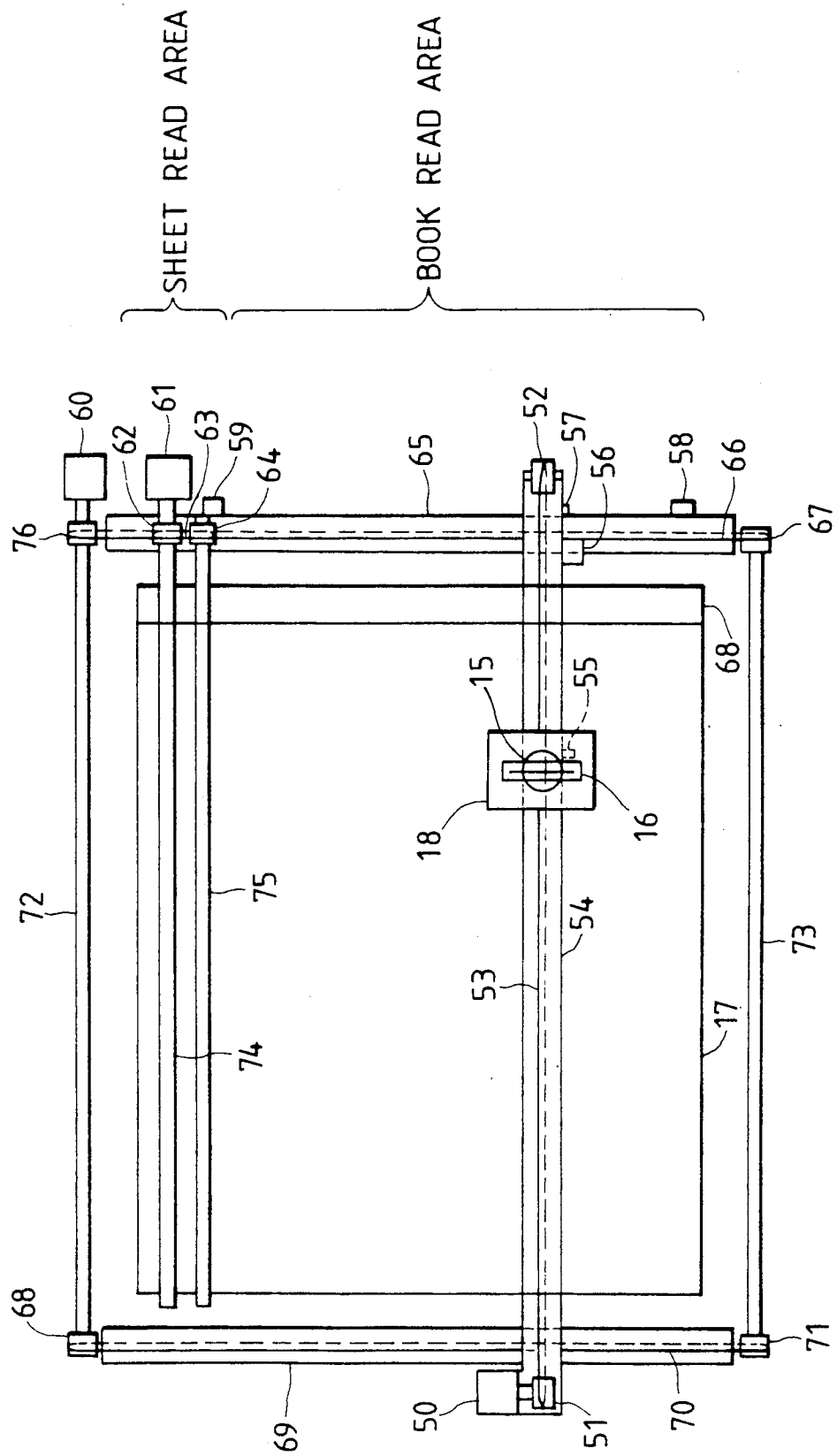
FIG. 6 is a schematic view of a driving mechanism for the scanner.
Figure 7:
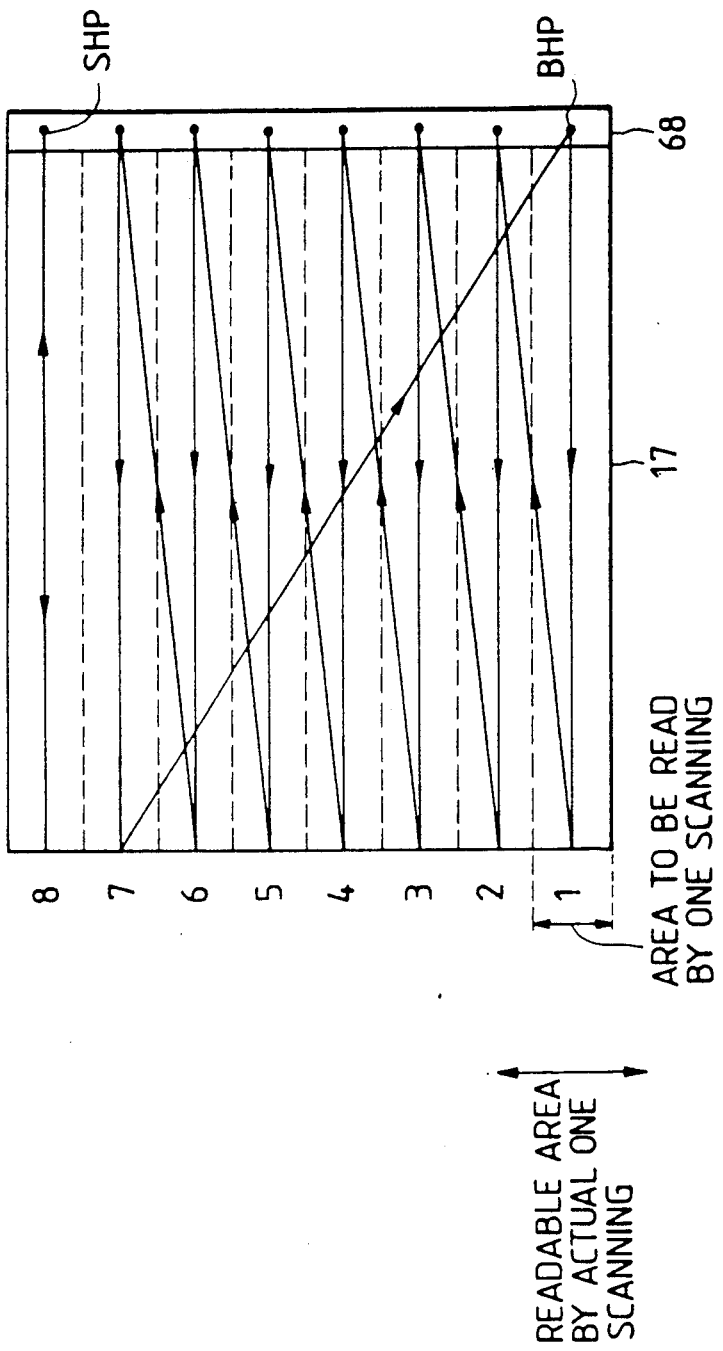
FIG. 7 is a schematic view showing the reading operation of the scanner.

Now reference is made to FIGS. 6 and 7 for explaining the function of the scanner unit 1.

FIG. 6 shows the internal structure of the scanner unit 1.

A CCD unit 18 is composed of a CCD 16, a lens 15 etc., and moves along a rail 54 by a drive system of the main scanning direction composed of a main scanning motor 50 fixed on the rail 54, pulleys 51, 52 and a wire 53, thereby reading the image on the original support glass 17 in the main scanning direction. A light shield plate 55 and a home position sensor 56 are used for position control in moving the CCD unit 18 to a main scanning home position in a correction area 68.

The rail 54 rides on rails 65, 69 and is moved by a sub scanning drive system composed of a sub scanning motor 60, pulleys 67, 68, 71, 76, shafts 72, 73 and wires 66, 70. A light shield plate 57 and home position sensors 58, 59 are used for position control in moving the rail 54 to sub scanning home positions in a book mode for reading a bound original placed on the original support glass 17, or in a sheet mode for reading a sheet original.

A sheet feeding motor 61, sheet feeding rollers 74, 75, pulleys 62, 64 and a wire 63 are provided for feeding a sheet original. This mechanism is provided on the original support glass 17 and is used for advancing the sheet original, placed face down, by predetermined amounts with sheet feeding rollers 74, 75.

FIG. 7 shows the reading operation in the book mode and the sheet mode.

In the book mode, the CCD unit 18 is at first moded to a book mode home position (BHP) in the correction area 68, and the reading operation for the original placed on the original support glass 17 is started from said position.

Prior to the scanning of the original, parameters necessary for the shading correction, black level correction, color correction etc. based on the output obtained in the correction area 68. Thereafter the scanning operation in the main scanning direction is started by moving the CCD unit 18 with the main scanning motor 50 in the illustrated direction. After the reading operation of an area (1), the main scanning motor 50 is reversed, and the sub scanning motor 60 is activated to displace the CCD unit 18 in the sub scanning direction to the correction area 68 of an area (2). Subsequently the shading correction, black level correction and color correction are conducted, if necessary, as in the area (1), and then the reading operation for the area (2) is conducted.

The above-explained operations are repeated to read the images in the area (1) to (7). After the reading of the area (7), the CCD unit 18 is returned to the book mode home position BHP.

In the present embodiment, the original support glass 17 can accommodate an original of A2 size at maximum. The number of scanning motions is larger in fact, but is simplified in the foregoing explanation for the purpose of simplicity.

In the sheet mode, the CCD unit 18 is moved to a sheet mode home position (SHP) and is reciprocated in an area (8), while the sheet original is intermittently advanced by predetermined amounts by the feeding motor 61, whereby the entire area of the sheet original can be read.

More detailedly, prior to the scanning operation, the shading correction, black level correction and color correction are conducted by the output obtained in the correction area 68, and then the CCD unit 18 is moved in the direction of arrow in the area (8) by means of the main scanning motor 50 thereby starting the scanning operation in the main scanning direction. After the reading operation in the forward main scanning motion in the area (8), the main scanning motor 50 is reversed. During said backward motion, the sheet feeding motor 61 is activated to advance the sheet original by a predetermined amount in the sub scanning direction. The entire area of the sheet original is read by repeating the above-explained operation.

In case of actual-size image reading, the area read by the CCD unit 18 is wider than each of the areas (1) to (7) as shown in FIG. 7. This is because the digital color copying apparatus of the present embodiment has the function of image enlargement and reduction. Since the recording head 37 can record an area of 256 bits in a single main scanning, there is required, for an image reduction of 50%, image information of 512 bits at minimum. Consequently the scanner unit 1 is provided with a CCD of at least 512 bits, and has a function of extracting image information of an arbitrary image area from the information of 512 bits obtained in a single main scanning.

In case the original image is enlarged to an image size larger than a recording sheet, the original is divided into plural areas as shown in FIG. 1A and the above-explained image reading operation is conducted in each of said areas.

The above-explained scanning method is called serial scanning method.

Function blocks of the apparatus

Figure 8:
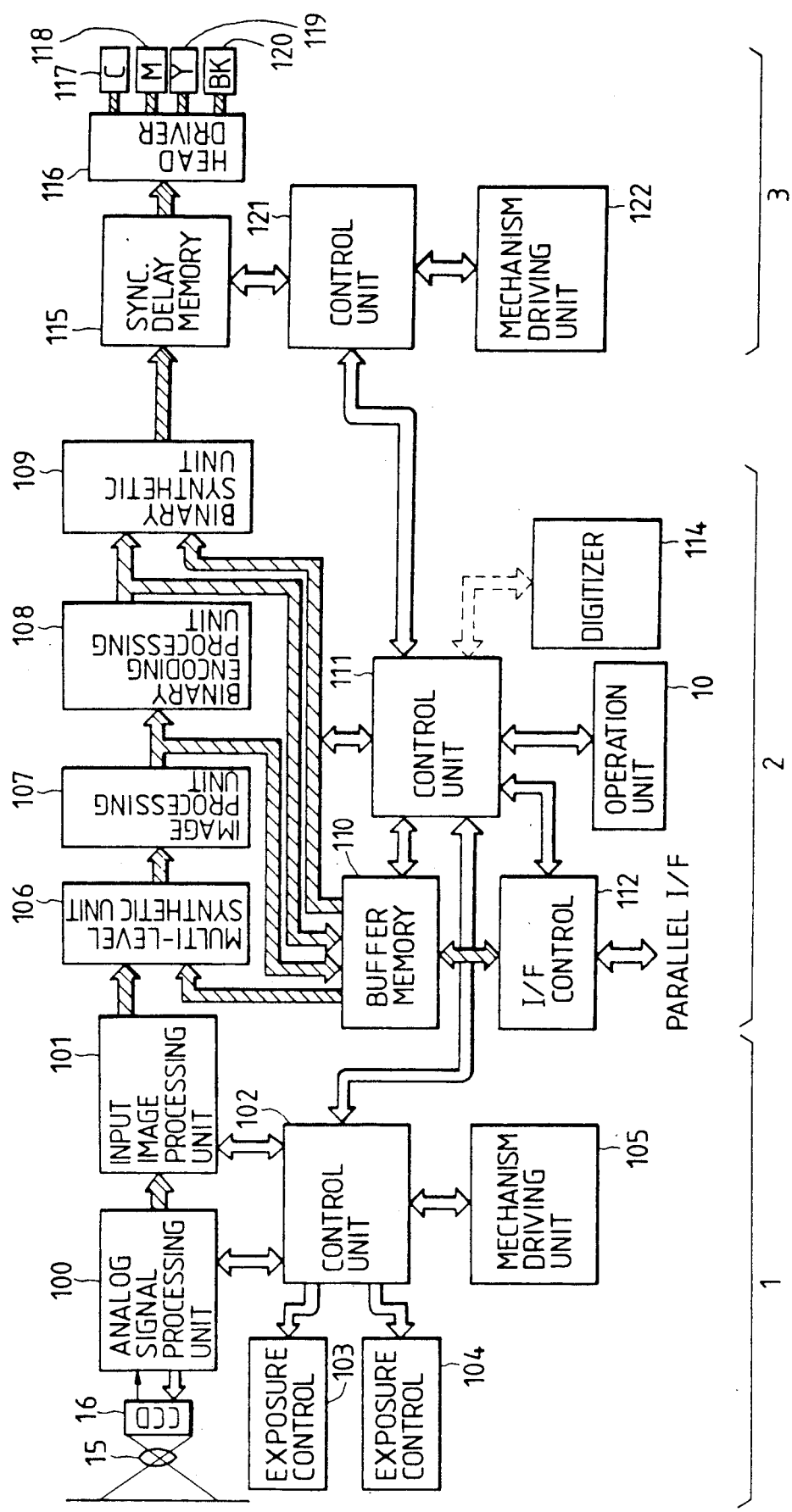
FIG. 8 is a block diagram of the circuits of the copying apparatus shown in FIG. 3.

Now reference is made to FIG. 8 for explaining the functional blocks of the digital color copying apparatus of the present embodiment.

Control units 102, 111, 121 for respectively controlling the scanner unit 1, controller unit 2 and printer unit 3 are each composed of a microcomputer, a program ROM, a data memory (RAM), a communication circuit etc. The control unit 111 is connected with communication channels with the control units 102, 121 to realize so-called master-slave control in which the control units 102, 121 function under the instructions of the control unit 111.

In the functions of the color copying apparatus, the control unit 111 functions in response to the instructions entered from an operation unit 10 and a digitizer 114.

Figure 9:
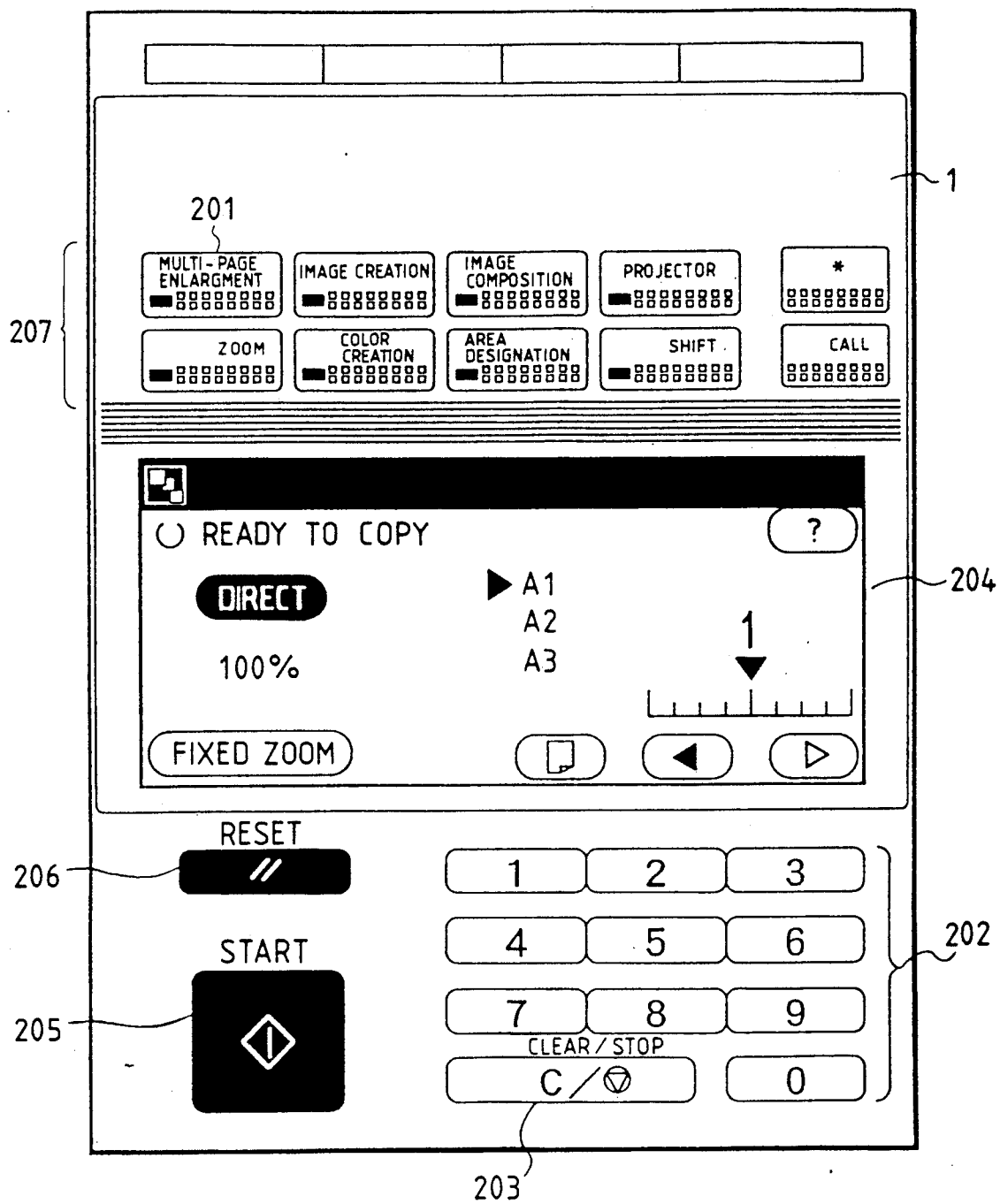
FIG. 9 is an external view of an operation unit.

The operation unit 10 is constructed as shown in FIG. 9. There is provided an LCD display unit 204 consisting of a liquid crystal display device combined thereon with a touch panel consisting of transparent electrodes, and used for entering instructions concerning colors and editing operations. Frequently used operation keys are provided separately, such as a start key 205 for starting the copying operation, a stop key 203 for terminating the copying operation, a reset key 206 for returning the operation mode to a standard state, numerals keys 202 for entering numbers, and keys 207 for selecting various editing functions.

The control unit 111 also controls an I/F control unit 112 for controlling general-purpose parallel interface such as IDDD-488 or GP-IB interface, to enable exchange of image data with external apparatus and remote control by an external apparatus through said interface.

Furthermore the control unit 111 controls a multilevel synthetic unit 106, an image processing unit 107, a binary encoding unit 108, a binary synthetic unit 109 and a buffer memory 110 which are used for various image processings.

The control unit 102 controls a mechanism control unit 105 for controlling the mechanisms in the above-explained scanner unit 1, an exposure control unit 103 for exposure lamp control is reading a reflective original, and an exposure control unit 104 for exposure control for a halogen lamp 90 used in a projector. It also controls an analog signal processing unit 100 and an input image processing unit 101, which are used for various image processings.

The control unit 121 controls a mechanism drive unit 122 for controlling the mechanisms in the printer unit 3 and a synchronization delay memory 115 for absorbing the fluctuation in time of the functions of the mechanisms of the printer unit 3 and compensating the delay resulting from the arrangement of the recording heads 117-120, as will be explained later in more detail.

Figure 10A:
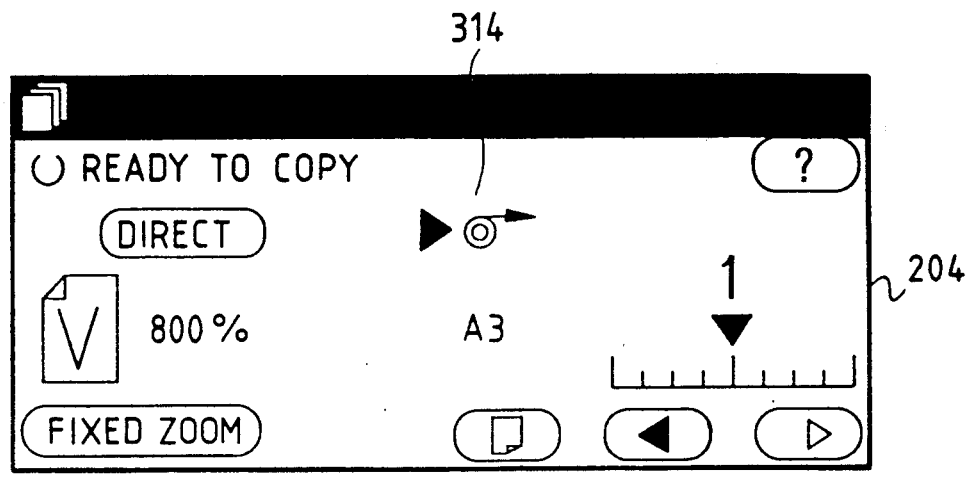
FIGS. 10A, 10B, 11, consisting of FIGS. 11A and 11B, 14 to 16 are views showing examples of display.
Figure 10B:
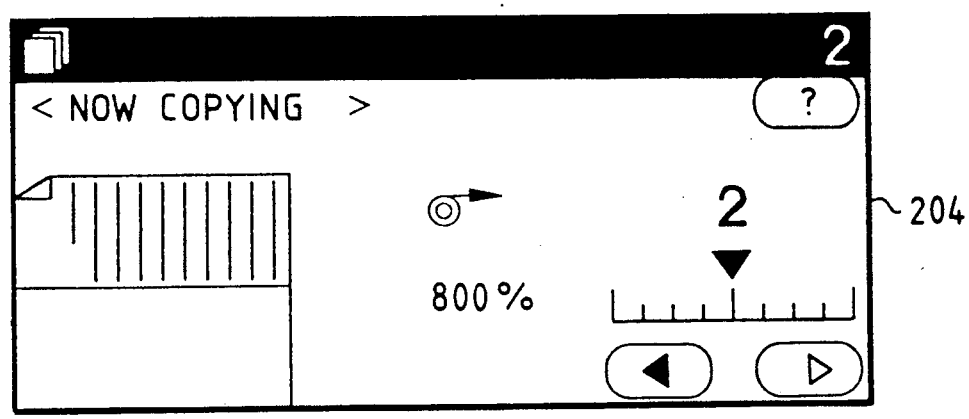

FIGS. 10A and 10B show examples of the display on the LCD display unit 204 of the operation unit 10, in case of the large-size copying explained above, wherein (a) and (b) respectively show states before and during the copying operation.

In three parameters of original size, image magnification and print size in the enlarged copying, if two are determined, the third parameter is automatically determined. For example, for an original size of A4 and an image magnification of 600%, there will be required a print size of 1260×1782 mm, which is larger than the rolled sheet for A1 size image recording. In such case, the copying can be made without wasting the recording sheet, by placing the A4-sized original in laterally oblong position as shown in FIG. 1A and recording the image of said original in three portions on the recording sheets as shown in FIG. 1B. Such copying operation is called multi-page enlarged copying.

Figure 11B:
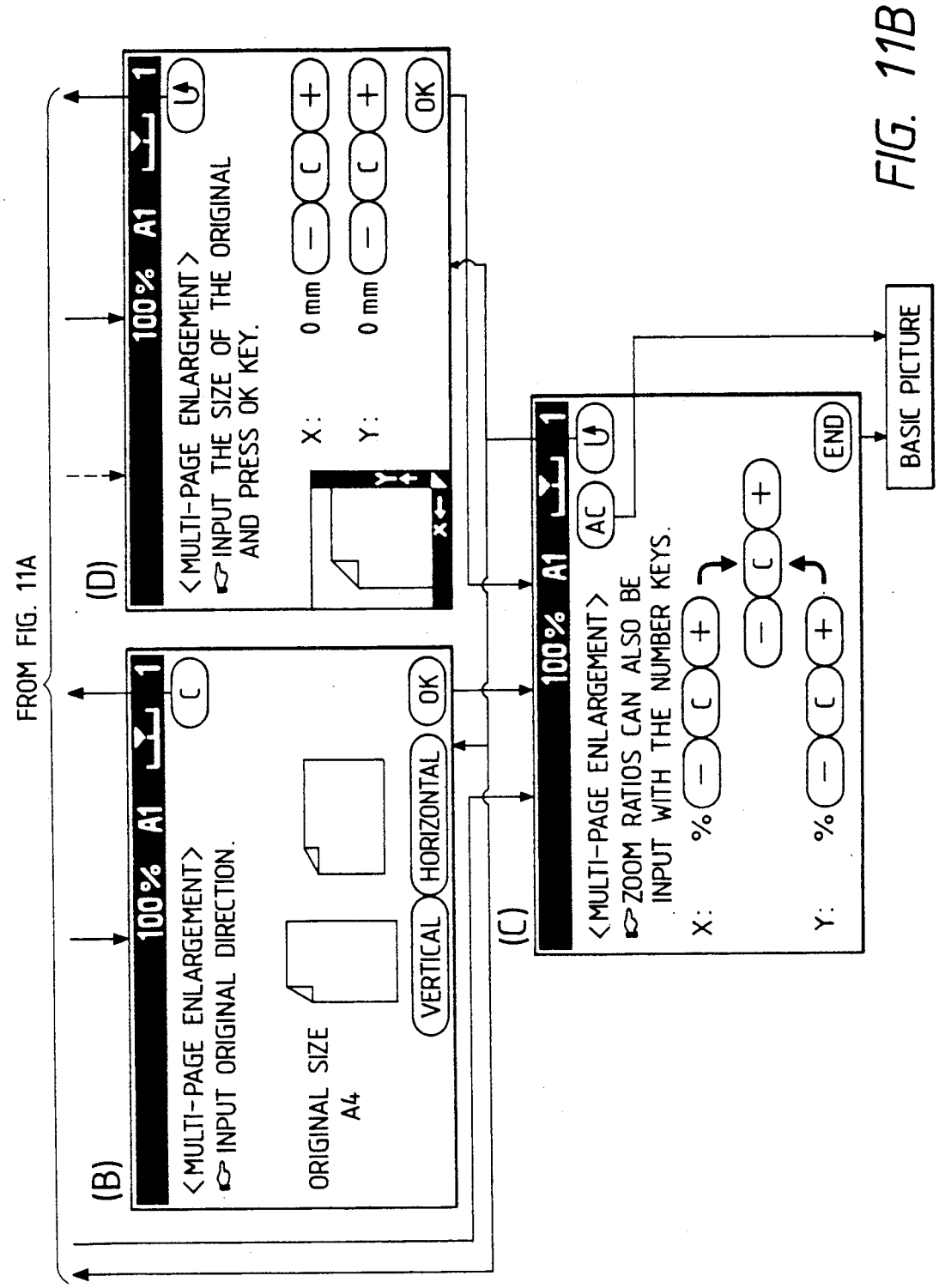

FIG. 11, consisting of FIGS. 11A and 11B, shows the flow of data setting required for such multi-page enlarged copying. A display (A) for entering the original size is obtained by depressing a multi-page copying key 201 shown in FIG. 9. By entering a fixed original size with a size key such as [A2], [B3] etc. excluding [A1] and [B1], there is obtain a display (B) for designating the position of the original. After the vertically or laterally oblong position is selected, an "OK" key is depressed to obtain a display (C) for entering the image magnification. Then the magnification is entered with "+" and "−" keys or numeral keys 202, and an "End" key is depressed to terminate the data setting, whereby the display returns to the basic state shown in FIG. 10A.

If a " " key is depressed in the display (A), there is obtained a display (D) for entering unfixed original size. In this case the sizes in the X and Y directions on the original support glass 17 are entered with the "+" and "−" keys or "C" key in the unit of millimeters, and then the "OK" key is depressed whereby the display (C) for entering the magnification is obtained. On the other hand, if the key [A1] or [B2] is depressed in the display state (A), the display changes to (C) without showing the display (B) for designating the position of the original, since, in the present embodiment, the original of A1 or B2 size can only be placed in the laterally oblong position on the original support glass 17.

Also if the fixed size of the original to be copied is not certain to the operator, or if the size measurement of the original and the size entry with the keys are cumbersome, there may be used the stick controller 99, in the display state (A), for entering a corner point of the original diagonal to the original point thereof, whereby the entered point and the original sizes in the X and Y directions are displayed in the state (D). If necessary, fine adjustments can be made with the "+" and "−" keys, and, if the results are satisfactory, the "OK" key is depressed to obtain the display (C). The stick controller 99 is disclosed in Japanese patent application Sho No. 63-123681 of the present applicant. Also such position designating means is not limited to such stick controller but may be replaced for example by a digitizer or the like.

In the display (C), the image magnification can be entered with the numeral keys 102 of the operation unit, and can be independently selected for the X and Y directions by means of the "+" and "−" keys.

Also if an area is designated in the trimming mode, such trimming area size is used as the original size. Therefore the entry of the original size is unnecessary in such case, and, in response to the depression of the multi-page enlarged copying key 101, there is obtained the display (C) for entering the image magnification, the display (A) being skipped.

Once the original size, direction of original and image magnification are determined in this manner, the LCD display unit 104 provides a display as shown in FIG. 10A. A further improvement in the operability can be achieved by displaying, the original size, the mode of division of the print sheet in graphic manner, the number of divisions and/or the length of rolled sheet in the sub scanning direction required in a single printing operation.

In such large-sized copying with the multi-page enlarged copying mode, it becomes necessary to indicate the progress of the operation to the operator, since a single copying operation requires a very long time. FIG. 10B shows an example of such display, in which the progress of the copying operation is rendered visible by lines, displayed in already copied part of a divided portion of the original, based on the number of completed main scanning operations. Also the number of divisions is indicated, in an area for indicating the number of copies, in FIG. 10B.

It is also possible to indicate, for example, the length of rolled sheet, in the sub scanning direction, required in a single printing operation.

FIG. 12 is a flow chart showing the control sequence for the display and the copying operation in the multi-page enlarged copying mode.

Referring to FIG. 12, steps SP701 and SP702 are for entering the original size, direction of the original, image magnification and number of prints according to the aforementioned procedure shown in FIG. 11, consisting of FIGS. 11A and 11B. Steps SP703 to SP705 are for setting the number N of divided areas on the rolled sheet according to the original size, direction of original and image magnification, the length of rolled sheet required for the recording in a divided area on the rolled sheet, and the number M of main scannings in an area. At the same time the number n of the already printed divided areas, and the number m of completed main scanning operations are initialized to zero.

Then a step SP706 sends the data of the original size, direction of original, number of prints, images magnification, number N of divided areas, and number M of main scannings of the scanner to the display unit to provide the display shown in FIG. 10A. Then a step SP715 discriminates whether the remaining amount of the rolled sheet is enough, and, if not, provides a display as will be explained later in relation to FIG. 15 and disables the start of the copying operation. On the other hand, in case of an enough remaining amount, the actuation of the start key 205 is awaited. In response to said actuation, a step SP707 initiates the printing operation. In the course of the printing operation, a step SP716 monitors the actuation of the stop key 203, and, if it is actuated, there is executed a stop routine to be explained later in relation to FIG. 13.

Then steps SP708 to SP710 increase the value m by one at the end of each main scanning operation in the scanner, and sends the values n, m to the display unit. When a step SP711 discriminates that the number m of the executed main scannings has reached the number M of main scannings in an area of the rolled sheet, a step SP712 resets the number m to zero, and increases the number n by one. Then a step SP714 discriminates whether the copying of all the divided areas has been completed according to whether the number n has reached the number N of divided areas, and, if not completed (n<N), the scanner starts the reading of a next divided area, and the printer cuts the rolled sheet (SP713).

Thus the copying operation is continued until a condition n=N is reached, and the values n, m are supplied to the display unit at every main scanning operation in the reader.

The display of the number of divisions and of the state of progress of the copying operation as shown in FIG. 10B are made possible by said numbers n, m.

Conventionally such state of progress of the printing operation is usually displayed by percentage for example with LED's of plural segments, but such display is insufficient in case of copying operation with plural print sheets as in the present embodiment. It is desirable to at least indicate the number of recording sheet under printing and the part thereof.

Though graphic display alone is used in the present embodiment, there may also be provided, at the same time, a display of time and a display of the number of scanning operations.

If the stop key 203 of the operation unit is depressed during a large-sized copying operation in the multipage enlarged copying mode, the LCD display unit 204 provides a display shown in FIG. 13A provided with three keys [MEMORY/STOP] 211, [MEMORY/CANCEL] 212 and [CANCEL] 213. If none of the keys is depressed, the operation is terminated at the end of copying operation of an area (a rolled sheet) under copying. If the copying operation of an area requires a long time to complete, the copying operation can be terminated immediately by the actuation of the [CANCEL] key 213.

If the copying operation is to be interrupted and re-started afterwards, the stop key 203 and the [MEMORY/STOP] key 211 are depressed in succession whereby the necessary data such as the count n of the divisions, original size, position of the original, image magnification etc., at the end of the copying operation for an area under processing, are stored in the RAM of the control unit 111, and the copying operation is terminated.

On the other hand, if the [MEMORY/CANCEL] key 213 is depressed, necessary data such as the count m of the main scannings of the scanner, count n of the divisions, original size, position of the original, image magnification etc., at the time of depression, are stored in the RAM of the control unit 111, and the copying operation is immediately terminated. The use of a back-up battery allows to maintain the above-mentioned data requiring for re-starting the copying operation, and to re-start the copying operation from the position of interruption afterwards.

Figure 14:
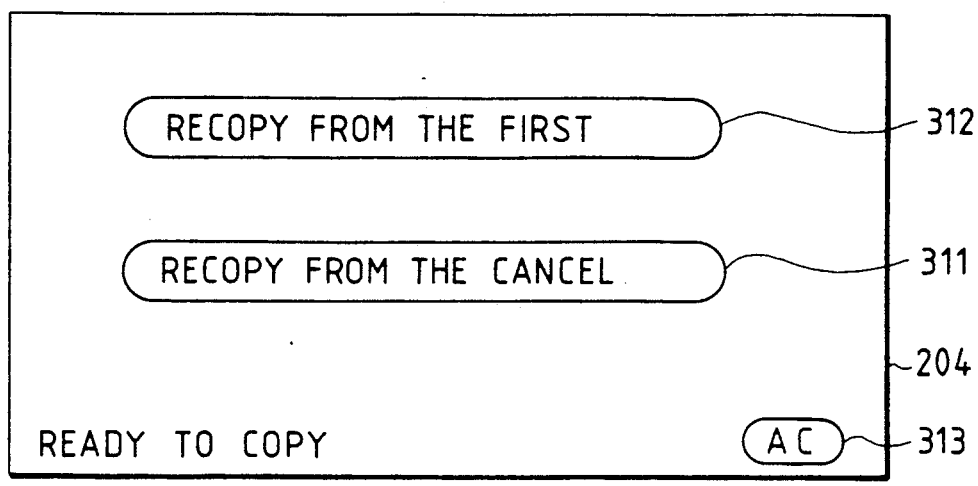

If the copying operation is terminated by the [MEMORY/STOP] key 211 or [MEMORY/CANCEL] key 212 and the multi-page enlarged copying key 201 is depressed again afterwards, the LCD display unit 204 does not show the display state (A) in FIG. 11, consisting of FIGS. 11A and 11B, for entering the original size but shows a copy re-start display shown in FIG. 14. In this state, the depression of a [RECOPY FROM THE CANCEL] key 311 initiates the copying operation from an area (or a main scanning) next to that where the previous copying operation is terminated. Also the depression of a [RECOPY FROM THE FIRST] key 312 clears the data at the interruption of the copying (count n and m) whereby the copying operation is started from the first main scanning in the first area. Also the depression of an [AC] key 313 clears all the information, whereby the display is shifted to a state (A) shown in FIG. 11, consisting of FIGS. 11A and 11B, for entering the original size. Thereafter the copying operation is started after the data setting anew.

In the enlarged copying, as explained before, by determining two of three parameters of the original size, image magnification and print size, the remaining parameter is automatically determined. Thus, in the multi-page enlarged copying mode, the print size is determined from the original size and the image magnification. Therefore, in said mode, the rolled sheet is automatically selected for printing because of the easier process, and a rolled sheet mark 314 is shown in the display of FIG. 10A.

Said rolled sheet mark 314 is not limited to the multi-page enlarged copying mode but is automatically displayed whenever the rolled sheet is selected.

The apparatus of the present embodiment can copy, at maximum, an A1-sized original (594×841 mm) with an image magnification of 1200% to obtain a print of 7128×10092 mm in the multi-page mode. In this case the original is divided into 12 reading areas, and each area requires a rolled sheet of 594×10092 mm for printing. Consequently the copying operation cannot be completed unless a rolled sheet of a length of at least 10092 mm is stored in the printer.

For this reason the printer shown in FIG. 4 is provided with a sensor 100 for detecting the remaining amount of the rolled sheet 29. Since there may be required the rolled sheet of 10092 mm at maximum in the present embodiment as explained above, detection is made, with a certain margin, when the remaining amount of the rolled sheets reaches 15000 mm (15 m).

Figure 15:
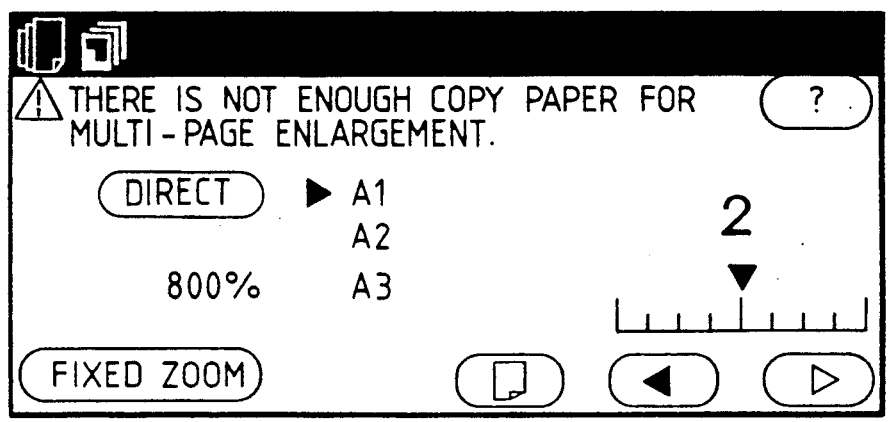
Figure 16:
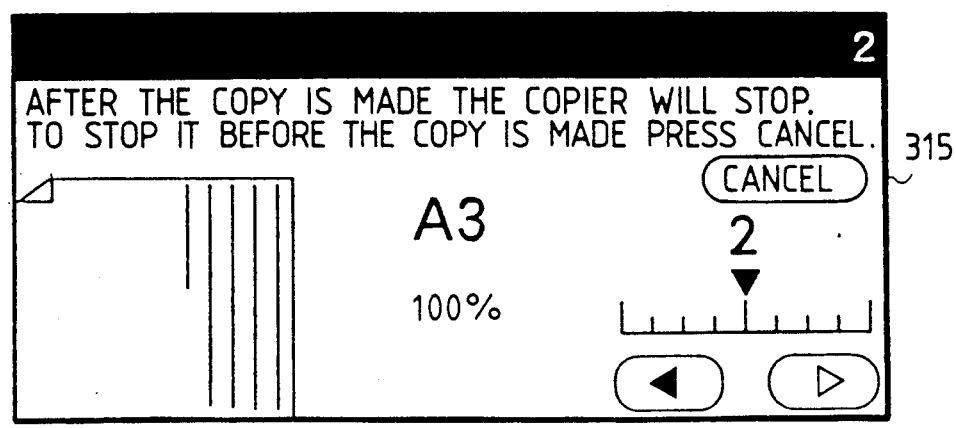

Thus, if said sensor 100 detects that the remaining amount of the rolled sheet is less than 15000 mm after the setting of the multi-page enlarged copying mode, a warning message is displayed on the LCD display unit 204 as shown in FIG. 15, and the start of the copying operation is prohibited. It is thus made possible to prevent the interruption of copying operation in the middle of an area resulting from the shortage of the rolled sheet.

In the ordinary copying, the maximum required length of the rolled sheet is 841 mm corresponding to the maximum print size which is the A1 size. Consequently, in the ordinary copying, the copying operation is still possible even after the sensor 100 detects that the remaining amount of the rolled sheet is less than 15000 mm.

The above-explained embodiment is not limited to the multi-page enlarged copying mode but is likewise applicable to an apparatus with detecting and alarming means for the length of the rolled sheet.

Also the copying stop means for the multi-page enlarged copying mode is effectively utilized in the ordinary copying, since a very long copying time is needed also in ordinary large-sized copying, for example of A1 size.

More specifically, in case of interrupting the copying operation, the display shown in FIG. 14 is shown in response to the depression of the stop key. The CANCEL key 315 is depressed if the copying operation is to be interrupted in the middle of a copy. If said key is not depressed, the copying operation is terminated at the end of a copy.

As explained in the foregoing, there is provided a simple operating method for effecting the multi-page enlarged copying, and said copying can be interrupted if another urgent copying is needed, and the interrupted copying can be re-started afterwards. Also it is possible to prevent a wasted copying operation by giving an alarm to the operator if the rolled sheet is not enough for the large-sized copying operation.

Figure 17:
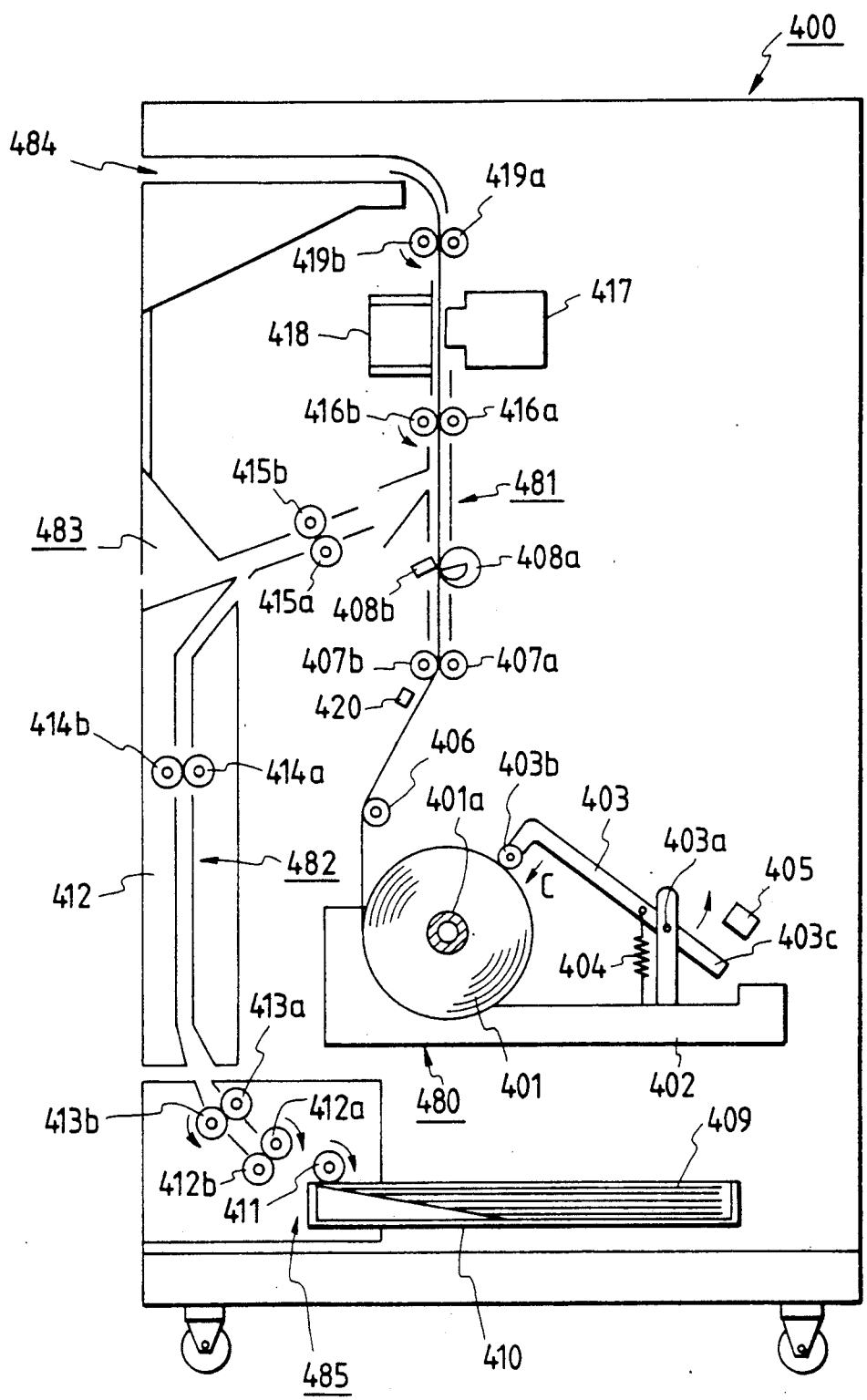
FIG. 17 is a cross-sectional view of another embodiment of the printer.

FIG. 17 is a lateral cross-sectional view of another embodiment of the printer unit 3 for use in the digital color copying apparatus shown in FIG. 3. A printer unit 400 shown in FIG. 17 also utilizes an ink jet recording head disclosed in the Japanese Laid-open Patent Sho No. 54-59936.

The printer 400 of the present embodiment, as in the printer shown in FIG. 4, can select, for recording, a rolled recording sheet 401 or cut recording sheets 409 of a predetermined size stored in a sheet cassette 410.

The rolled sheet 401 is loaded in a rolled sheet holder 480 and is guided, through a rolled sheet path 481, to a recording position with an ink jet recording head 417. On the other hand, the cut sheet 409 stored in the sheet cassette 410 is advanced by a pickup roller 411 into a cut sheet path 482 and is transported to the recording position with the ink jet head 417, by transport rollers 412a, 412b-416a, 416b. Also a cut sheet inserted from a manual insertion slot 483 is supplied to the upper part of the cut sheet path 482 and is transported to the position of said ink jet head 417.

The rolled sheet 401 is wound on a reel 401a and is rotatably housed in the holder 480.

The path 481 for the rolled sheet 401 is provided with a guide roller 406, paired setting rollers 407b, 407a, a cutter 408 and paired transport rollers 416a, 416b. A metal driving roller 407b is rotated by a rolled sheet transport motor 458 to be explained later, and drives the rolled sheet 401 toward the cutter 408 in cooperation with a rubber idler roller 407a.

The cutter 408 is composed of a rotating blade 408a and a fixed blade 408b, and cuts the rolled sheet 401 into a predetermined size by the rotation of the rotating blade 408a caused by a cutter drive unit 456 to be explained later. A driven roller 416b and an idler roller 416a are maintained in pressure contact and advance the rolled sheet 401 toward the ink jet head 417 as the roller 416b is driven by an unrepresented transport motor in a direction indicated by arrow.

Said ink jet head 417 is mounted, in a similar manner as shown in FIGS. 3 and 5, on a carriage which is moved in reciprocating motion by a carriage motor 457 to be explained later, in a direction perpendicular to the plane of the drawing. In synchronization with said motion, the ink jet head 17 emits inks corresponding to the image signals from the scanner unit 1 shown in FIG. 3, whereby a color image is recorded on the rolled sheet 401 or the cut sheet 409 transported to the recording position. A platen 418 attracts the rolled sheet 401 or the cut sheet 409 for example by an unrepresented suction pump, thereby supporting said sheet in the recording position. A discharge driven roller 419b, driven by a sheet discharge motor 460 to be explained later, discharges the recorded sheet through a sheet discharge slot 484, in cooperation with an idler roller 419a. A detection lever 403 for detecting the diameter of the rolled sheet 401 is articulated at a shaft 403a and is provided, at an end facing the rolled sheet 401, with a roller 403b which is biased by a spring 404 with a constant pressure toward the rolled sheet 401. Thus, as the diameter of the rolled sheet 401 decreases by the use of said sheet, the lever 403 moves in a direction c, whereby the other end 403c of the lever 403 opposite to the roller 403b is elevated eventually to the position of a photosensor 405 thereby detecting the remaining amount of the rolled sheet 401.

As the printer unit 400 of the present embodiment is capable of producing a long print for example in the aforementioned multi-page enlarged copying mode, the running-out of the rolled sheet 401 in the course of such long printing operation is prevented in the following manner. Since the present embodiment is capable, in the multi-page enlarged copying mode, of a printing on the rolled sheet of 10092 mm at maximum as explained before, the photosensor 405 is so positioned as to detect the end 403c of the lever 403 when the diameter of the rolled sheet 401 corresponds to a remaining amount of 15 meters, with a certain margin, corresponding to the above-mentioned length. Upon detection of said end 403c by the photosensor 405, there is prohibited the recording operation on a long rolled sheet or is given an alarm as shown in FIG. 15. A sheet end sensor 420 detects, by reflected light, a mark M for example a detachable black seal attached close to the end of the rolled sheet 401, thereby identifying a low remaining amount of said sheet.

Figure 23:
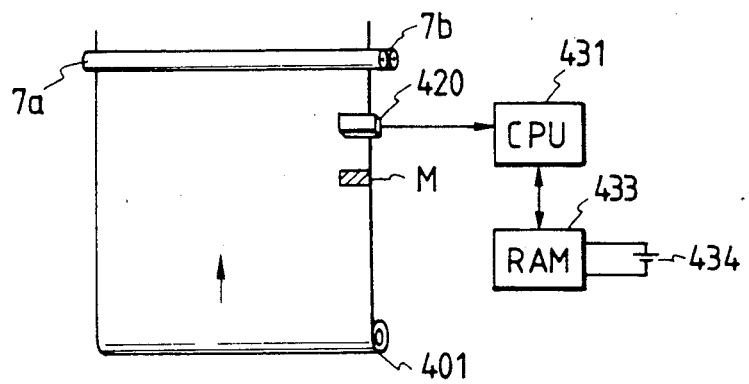
FIG. 23 is a schematic view showing a mechanism for black seal detection.

FIG. 23 shows the relationship between the position of the sensor 420 and the black seal M attached on the rolled sheet 401.

Figure 24:
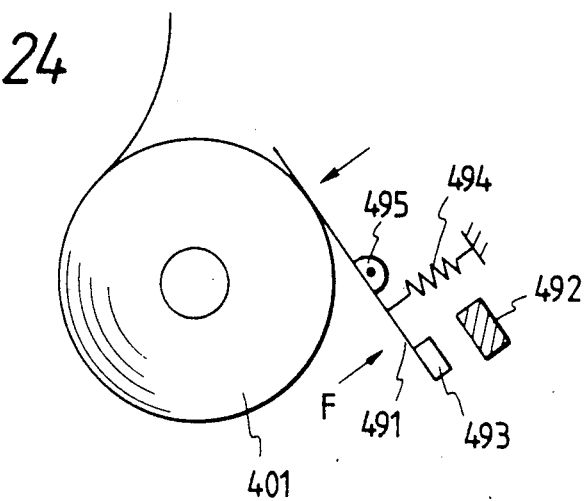
FIG. 24 is a schematic view showing another embodiment for detecting the remaining amount of the rolled sheet.

FIG. 24 shows another embodiment for detecting the change in diameter of the rolled sheet 401.

As in FIG. 17, the end of a lever 491 is maintained contact with the periphery of the rolled sheet 401. Said lever 491 is rotatably supported by a shaft 495 and is biased in a direction F by a spring 494. As the diameter of the rolled sheet 401 decreases, a projection 493 formed on the lever 491 interrupts the light of a photointerrupts 492. Thus a predetermined remaining amount (for example 15 m) of the rolled sheet can be detected by suitably adjusting the position of said photointerruptor 492.

Figure 18:
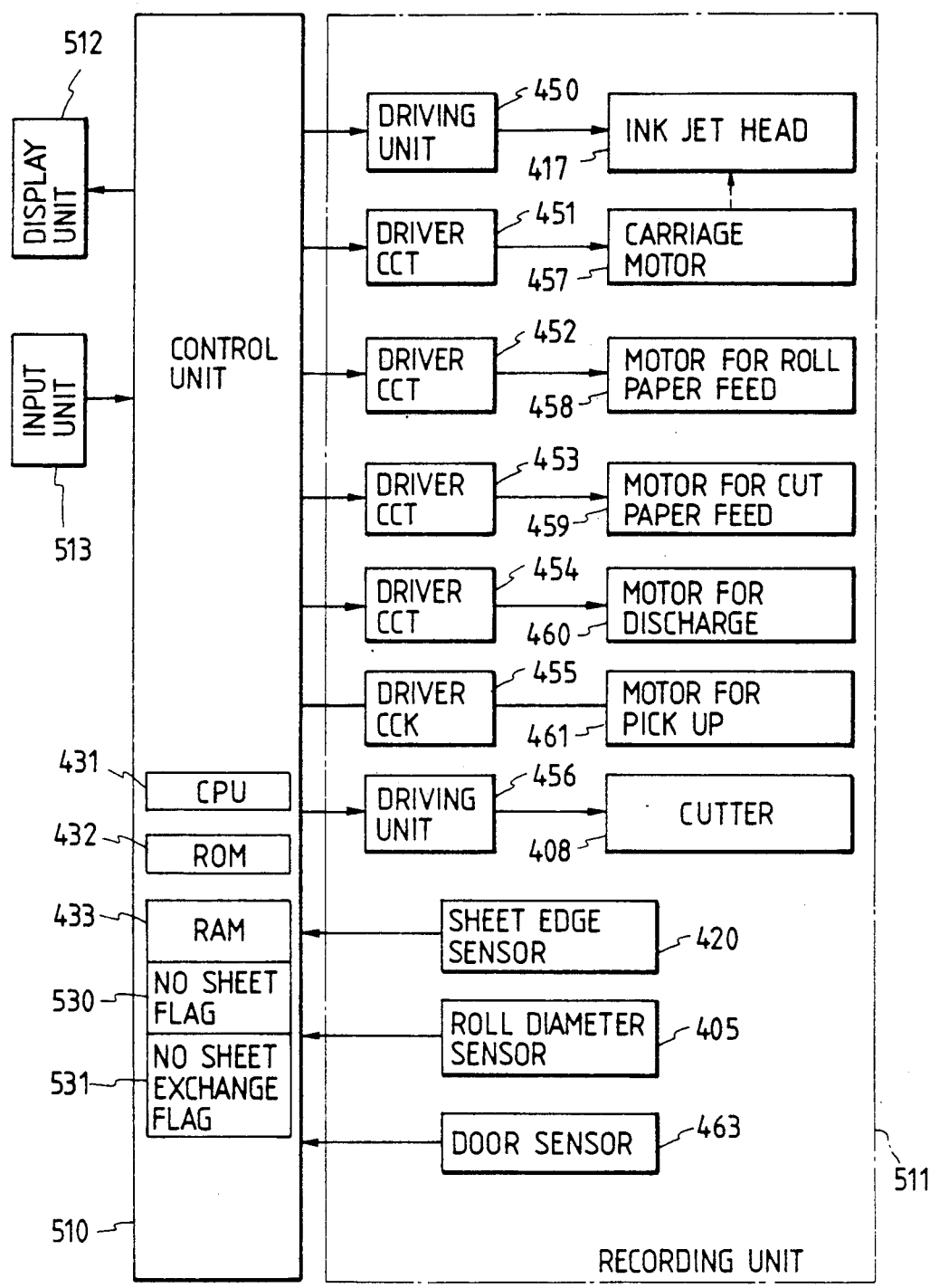
FIG. 18 is a block diagram of the printer shown in FIG. 17.

FIG. 18 schematically shows the electrical connections between a control unit 510 and a recording unit 511 in the printer 400 shown in FIG. 17, corresponding to the control unit 121 and the mechanism drive unit 122 shown in FIG. 8.

Figure 21:
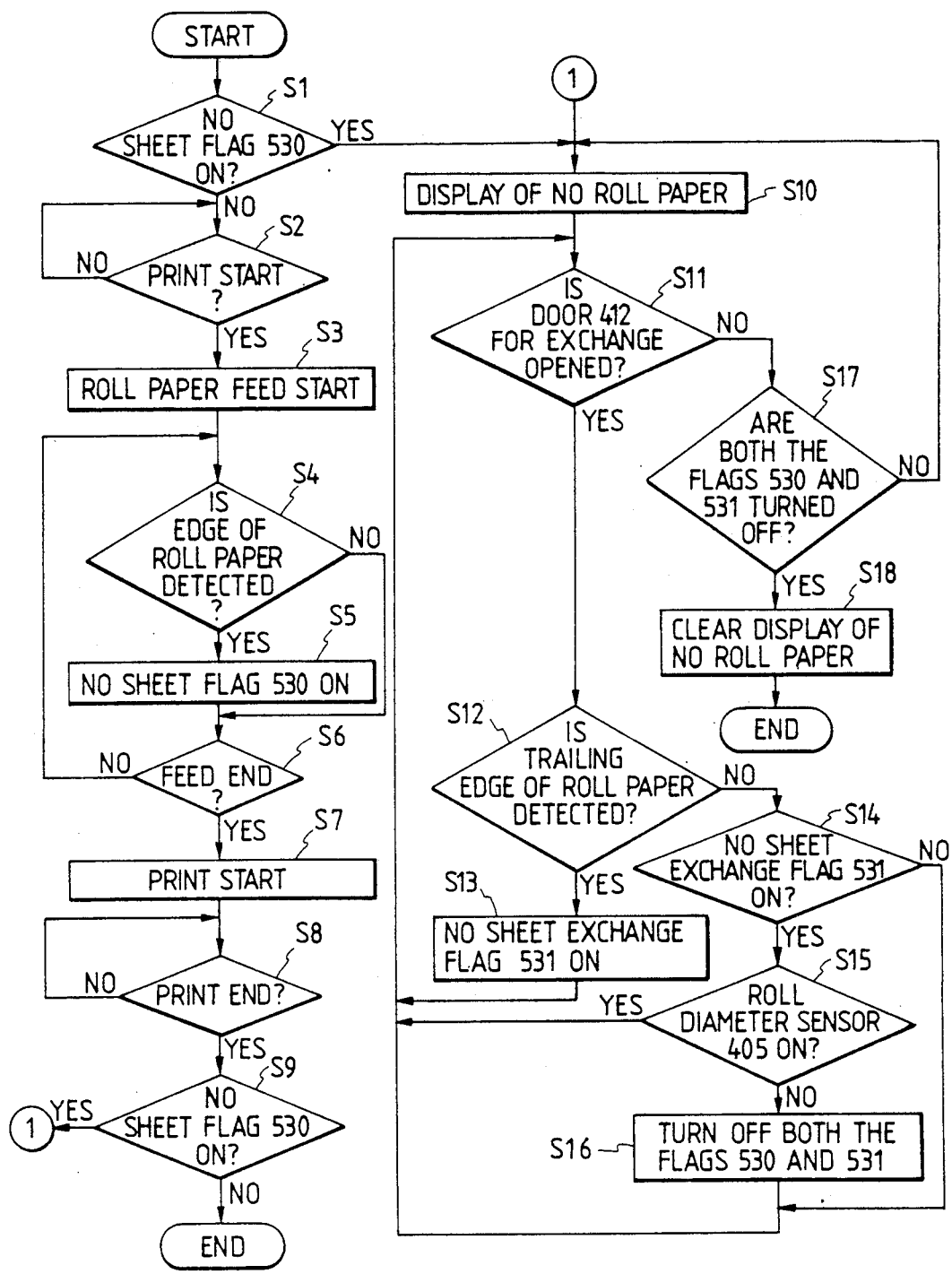
FIG. 21 is a flow chart of a sequence for detecting the remaining amount of the rolled sheet in said printer.

A control unit 150 for controlling the entire printer unit of the present embodiment is provided with a CPU 431 for example a microprocessor, a ROM 432 storing the control program of the CPU 431 corresponding to a flow chart shown in FIG. 21 and various data, and a RAM 433 used as a work area of the CPU 431 for temporary storage of various data. A no sheet flag 530 to be turned on when the end sensor 420 detects that the rolled sheet 401 has approached to its end, and a no sheet exchange flag 531 to be turned on when a door 412 to be explained later is opened for exchanging the rolled sheet 401 while said no sheet flag 530 is on, are set in said RAM 433.

A display unit 512 for displaying the state of the printer unit 400 and various messages and alarms to the operator displays, for example, a display for the absence of the rolled sheet 401, and a display for the absence of the cut sheet 409. An input unit 513 serves to receive recording data from an external apparatus (scanning unit 1, controller unit 2), and instructions from an unrepresented operation unit.

A recording unit 511 is provided with motors and an ink jet head 417 and executes image recording on the rolled sheet 401 or the cut sheet 409. In the following the structure of said recording unit 511 will be schematically explained.

A serial ink jet head 417 is provided, as shown in FIG. 5, with plural heads for emitting inks of different colors for achieving a color recording. There are further provided a driving unit 450 for driving the ink jet head 417 according to the image data to be recorded; a carriage motor 457 for driving a carriage supporting the ink jet head 417 in a direction perpendicular to the plane of FIG. 13; a rolled sheet transport motor 458 for rotating transport rollers in the transport path 481 for the rolled sheet 401; a cut sheet transport motor 459 for rotating rollers in the cut sheet transport path 482; a sheet discharge motor 460 for rotating the sheet discharge roller 419b thereby transporting the rolled sheet after recording and cutting or the recorded cut sheet to the discharge slot 484; a pickup motor 461 for driving the pickup roller 411 for advancing cut sheets 409 one by one from the sheet cassette 410; driver circuits 451–455 for driving the above-mentioned motors; and a driving unit 456 for the cutter 408, for rotating the rotary blade 408b by an unrepresented motor.

There are further shown an end sensor 420 for detecting the remaining amount of the rolled sheet 401 by the absence of reflected light from a black seal M attached on the end portion of the rolled sheet 401 or in the vicinity thereof; a roll diameter sensor 405 for detecting the roll diameter corresponding a predetermined length of the rolled sheet 401; and a door sensor 463 for detecting the opening of a door 412 for exchanging the rolled sheet 401, for example when the absence of sheet is displayed.

Door 412 (FIG. 19)

FIGS. 19A and 19B respectively show open and closed states of the door 412.

As shown in FIG. 19A, the door 412 is rotatably mounted about a shaft 412a. 485 and 486 are guide plates of the cut sheet path 482.

FIG. 19B shows a state in which the door 412 is opened from the state shown in FIG. 19A. By said door opening, a part of the cut sheet path 482 is retracted, and it is rendered possible to extract the holder 480 and exchange the rolled sheet 401.

Figure 19C:
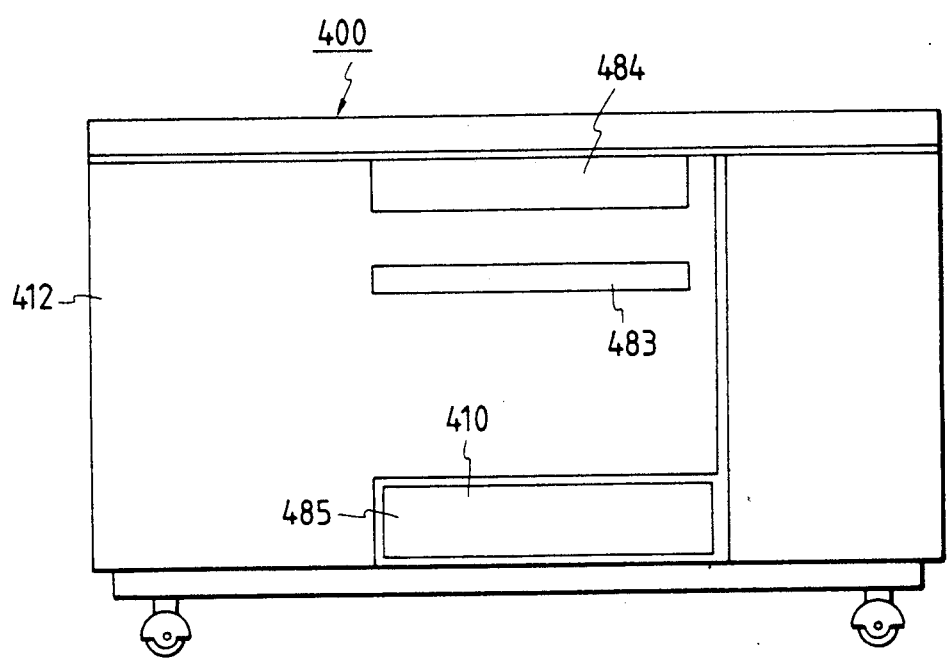
FIG. 19C is a front view of said printer wherein the door is closed.

As shown in FIG. 19C, the door 412 covers the opening of the apparatus from the upper part of a cassette mounting part 485 to the lower part of the sheet discharge slot 484, and is provided with the manual insertion slot 483. As shown in FIG. 19B, the door sensor 463 is mounted, at an end of the door, on a main frame 520. Said sensor is turned off by being pushed by a projection 463a of the door 412 when it is closed, or turned on when the door is opened as shown in FIG. 19B. In FIG. 19B, 464 indicates the opening of the apparatus.

Figure 20:
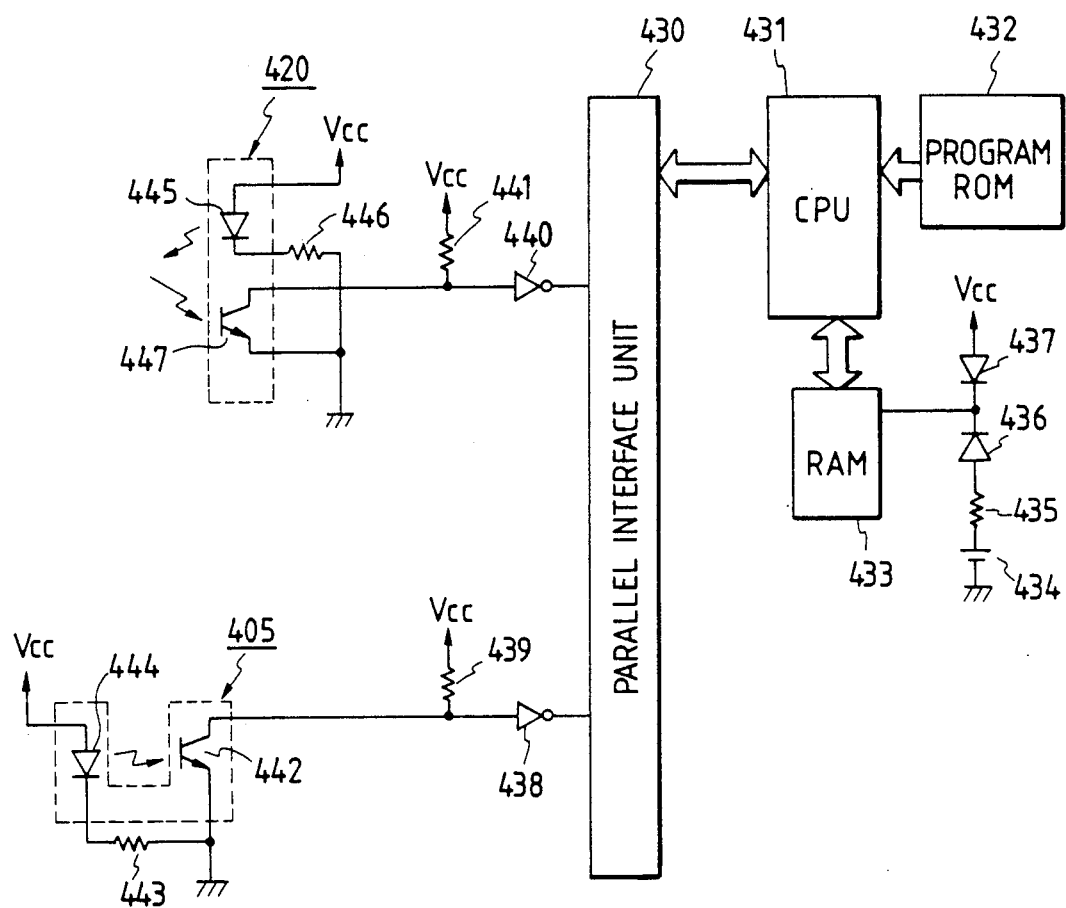
FIG. 20 is a block diagram showing the connection between sensors and a CPU.

Sensor circuit (FIG. 20)

FIG. 20 shows the structure of the end sensor 420 and the roll diameter sensor 405 for the rolled sheet 401, and the connection of said sensors with the CPU 431.

In the end sensor 420, the light from a light-emitting diode 445 is reflected by a mark positioned close to the end of the rolled sheet 401 and is received by a phototransistor 447, which is associated with a pullup resistor 441 and an inverter 440. When the sensor 420 detects the black seal in the vicinity of the end of the rolled sheet 401, the phototransistor 447 no longer receives the reflected light whereby the output of the inverter 440 is shifted from the high level to the low level. Similarly the roll diameter sensor 405 is composed of a light-emitting diode 444 and a phototransistor 442. When the end 403c of the lever 403 is positioned between said light-emitting diode 444 and said phototransistor 442 to intercept the light from said light-emitting diode 444, the phototransistor 442 is turned off. Consequently, when the roll diameter sensor 405 detects that the diameter of the rolled sheet 401 has become smaller than a predetermined value, the output of the inverter 438 is shifted to the low-level state. There are also shown current limiting resistors 43, 446 for the light-emitting diodes, and a pullup resistor 439.

The signals from the sensors 405, 420 are supplied to the CPU 431 through a parallel interface unit 430. A backup battery 434 for the RAM 433 has an output voltage smaller than Vcc. Consequently, when the power supply for the printer unit 400 is turned on, the electric power is supplied to the RAM 433 through a diode 437, but, when said power supply is turned off, the power is supplied through a diode 435. Thus the data in the RAM 433 are retained without erasure even when the power supply for the printer unit 400 is turned off. A current limiting resistor 435 is provided for limiting the current to the RAM 433 from the backup battery.

Explanation of functions (FIGS. 17–21)

FIG. 21 is a flow chart of detection for the remaining amount of the rolled sheet 401, to be executed prior to the recording on the rolled sheet 401 in the printer unit 400 of the present embodiment, corresponding to the step SP715 in FIG. 12. In the following there will be explained the function with reference to said flow chart. In the following it is assumed that the image recording is made on the rolled sheet 401 because such recording is instructed or because the cut sheets 409 are not loaded.

At first a step S1 discriminates whether the no sheet flag 530 is turned on, indicating that the send sensor 420 has detected the end portion of the rolled sheet 401. If said flag is on, the sequence proceeds to a step S10. On the other hand, if said flag is off, indicating that the recording operation is enabled, the sequence proceeds to a step S2 for awaiting the entry of a print start instruction from an external unit. When the printing operation is started, a step S3 activates the rolled sheet transport motor 458, thereby starting the transportation of the rolled sheet 401.

A step S4 discriminates whether the end sensor 420 detects the end portion of the rolled sheet 401 in the course of said transportation thereof, from a fact whether the output of the inverter 440 is at the low level state. If it is in the low level state indicating the detection of the end portion, the sequence proceeds to a step S5 for turning on the no sheet flag 530 in the RAM 433. Then a step S6 awaits the completion of transportation of the rolled sheet 401, and the sequence thereafter proceeds to a step S7. The black seal M is so positioned as to leave the rolled sheet corresponding at least to a print therebehind, so that the step S7 executes the printing operations by activating the ink jet head 417 even when the black seal M has been detected.

When the printing operation is completed in a step S8, a step S9 discriminates whether the no sheet flag 530 is on, and, if it is off, the sequence is terminated. On the other hand, if it is on, the sequence proceeds to a step S10 for displaying the absence of rolled sheet 401 on the display unit 512. Then a step S11 discriminates whether the door 412 is opened by the signal from the door sensor 463, and, when the door 412 is opened, a step S12 discriminates whether the end sensor 420 still detects the presence of the end portion of the rolled sheet 401 or detects the detachment of said rolled sheet 401. If the end portion of the rolled sheet 401 or the absence thereof is detected, a step S13 turns on the no sheet exchange flat 531, and the sequence returns to the step S11.

When the rolled sheet 401 is loaded anew, the end sensor 420 detects the light reflected from said rolled sheet 401, whereby the sequence proceeds from the step S12 to a step S14 for discriminating whether the no sheet exchange flag 531 is on. If it is off, indicating that the door 412 has been opened not for exchanging the rolled sheet 401 but for the internal inspection or the like, the sequence returns to the step S11. If the flag 531 is on in the step S14, a step S15 discriminates whether the output of the inverter 438 is in the low level state, indicating that the roll diameter sensor 405 is turned on and the diameter of the rolled sheet 401 is smaller than a predetermined value. If said roll diameter sensor 405 detects the end 403c of the lever 403, indicating a small diameter of the roll, the sequence returns to the step S11. On the other hand, if the sensor 405 detects that the roll diameter is larger than said predetermined value due to the replacement of the rolled sheet 401, the sequence proceeds to a step S16 for resetting the no sheet flag 530 and the no sheet exchange flat 531.

When the step S11 identifies the closed state of the door 412, the sequence proceeds to a step S17 to discriminate whether both the no sheet flag 530 and the no sheet exchange flag 531 are reset. If either flag is on, indicating that the remaining amount of the rolled sheet 401 is still limited, the sequence returns again to the step S10 for giving a display requesting the exchange of the rolled sheet 401. On the other hand, if both flags are reset in the step S17, the sequence proceeds to a step S18 for erasing the display for absence of rolled sheet from the display unit 512, and the sequence is terminated.

In the present embodiment, as explained above, the absence of rolled sheet is detected by the aforementioned black seal M, but this state is cancelled as long as the roll diameter sensor 405 detects that the diameter of the rolled sheet 401 exceeds a predetermined value. Consequently, the no sheet state cannot be cancelled by opening the door 412 and re-loading the same rolled sheet 401 again. In this way it is possible to prevent a lowered print quality in a portion of the rolled sheet 401 close to the end thereof. Also since the no sheet flag 530 and the no sheet exchange flag 531 are stored in the RAM 433 with backup battery, the remaining amount of the rolled sheet can be maintained correctly even if the power supply of the printer is cut off at the exchange of the rolled sheet.

Figure 22:
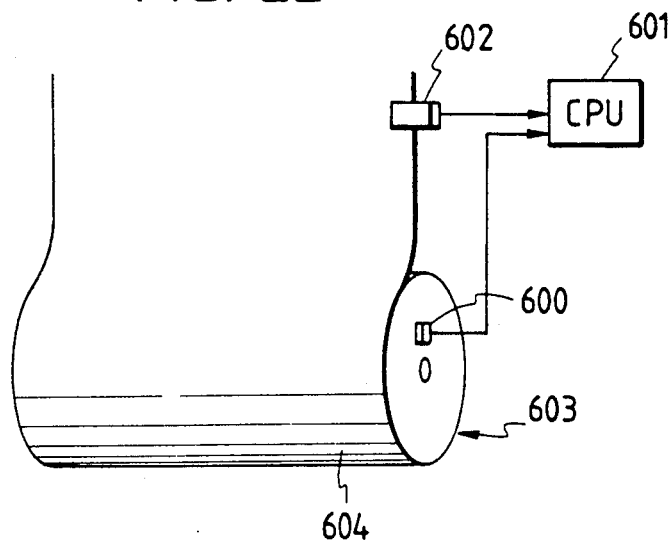
FIG. 22 is a schematic view showing the sensor of another embodiment and the mounting state thereof.

Another embodiment (FIG. 22)

FIG. 22 shows another embodiment for detecting the remaining amount of the rolled sheet 604.

In FIG. 22, a photointerruptor 600 detects the reflected light from the end face of the rolled sheet 604. When the diameter of the rolled sheet 604 becomes smaller than the position of said photointerruptor 600, it no longer detects said reflected light, and informs a CPU 601 of the lowered remaining amount of the rolled sheet 604. A photosensor 602, similar to the aforementioned end sensor 620, detects the low remaining amount of the rolled sheet 604 by a black seal or the like attached in an end area of the rolled sheet 604.

In the foregoing embodiments, a detachable black seal has been employed for detecting the end portion of the rolled sheet, but it may be replaced, for example, by a pencil mark or the like which can be easily erased with a rubber eraser.

Also the foregoing embodiments have been limited to ink jet printers, but they are likewise applicable to recording apparatus employed a rolled sheet, such as a thermal printer, a wire dot printer, or an electrophotographic recording/copying apparatus.

Also in the foregoing embodiments there is employed only one mark, but there may be provided plural marks in order to avoid eventual error in detection, resulting from malfunction of the sensor or from alignment error of the sheet with respect to the sensor.

In the foregoing embodiments, a detachable or erasable mark, formed in an end portion of the rolled sheet, is used for detecting the remaining amount of the rolled sheet, and said mark can be erased after recording in order to avoid deterioration in quality of the recorded image.

In addition the detection of the rolled sheet is effected to avoid error in the direction of the remaining amount. Furthermore, the flag indicating the detection of the end portion of the rolled sheet and the flag indicating the opening of the door for rolled sheet exchange are memorized in non-volatile manner to enable correct discrimination of the remaining amount of the rolled sheet even if the power supply of the apparatus is once cut off.

It is furthermore possible to provide a warning in advance if shortage of sheet may occur in the course of a long printing operation, by setting said mark at a position corresponding to the remaining amount of the longest possible printing operation.

It is thus made possible, as explained in the foregoing, to exactly detect the remaining amount of the recording medium Also the mark indicating the low remaining amount of the recording medium is made detachable or erasable, so that the deterioration of image quality by said mark can be avoided.

The present invention has been explained by the preferred embodiments thereof, but it is not limited to such embodiments and is subject to various modifications within the scope and spirit of the appended claims.

We claim:

1. An image forming apparatus comprising:
   output means for outputting a frame of image data in a divided manner;
   recording means for recording in order a plurality of images corresponding to the divided image data output from said output means, respectively on plural recording materials;
   manual instruction means for instructing interruption of the image recording operation by said recording means and for re-starting the interrupted image recording operation; and
   control means for controlling the image recording operation of said recording means, wherein said control means interrupts the image recording operations in accordance with the interruption instruction from said manual instruction means, and wherein said control means re-starts the interrupted image recording operation in accordance with the re-start instruction from said manual instruction means.

2. An apparatus according to claim 1, wherein said recording means is adapted to record each of said images in an enlarged manner.

3. An apparatus according to claim 1, wherein said recording means is adapted to effect image recording on a recording material cut from a rolled recording material.

4. An apparatus according to claim 1, wherein said control means is adapted to maintain the restart of the interrupted image recording operation.

5. An image forming apparatus comprising:
   output means for outputting image data enlarged from an original image;
   recording means for recording an enlarged image of the original image on a recording material based on the image data output from said output means;
   detection means for detecting the remaining amount of recording material used for recording; and
   control means for prohibiting the image recording by said recording means when said detection means detects that the amount of the recording material is insufficient for the recording of a maximum image size recordable by said recording means.

6. An apparatus according to claim 1, wherein said detection means detects the diameter of the rolled recording material used for image recording.

7. An apparatus according to claim 5, wherein said recording means is adapted to effect image recording on a rolled recording material.

8. An apparatus according to claim 5, wherein said output means is adapted to output the image data enlarged from the original image in a divided manner, and wherein said recording means is adapted to record the images corresponding to the divided image data released from said output means, respectively on plural recording materials.

9. An image forming apparatus comprising:
   output means for outputting image data representing an original image;
   recording means for image recording on a rolled recording material based on the image data from said output means;
   first detection means for detecting a mark formed in the vicinity of the end of said rolled recording material;
   second detection means for detecting that the diameter of said rolled recording material is at most a predetermined value; and
   control means for prohibiting the image recording by said recording means in accordance with the detection of said mark by said first detection means, and for cancelling the prohibition of the image recording if said second detection means does not identify that the diameter is at most the predetermined value.

10. An apparatus according to claim 9, wherein said recording means is adapted to record an image enlarged from the original image.

11. An apparatus according to claim 9, further comprising display means indicating the prohibited state of image recording.

12. An apparatus according to claim 9, wherein said mark is detachable from the recording material or erasable.

* * * * *

UNITED STATES PATENT AND TRADEMARK OFFICE
CERTIFICATE OF CORRECTION

PATENT NO. : 5,023,728
DATED : June 11, 1991
INVENTOR(S) : MITSUO NIMURA, ET AL.

It is certified that error appears in the above-identified patent and that said Letters Patent is hereby corrected as shown below:

COLUMN 1

Line 10, "apparatus" should read --apparatuses--.
    Line 16, "factor" should read --factor,--.
    Line 38, "sub scan-" should read --sub-scan- --.
    Line 45, "Also" should read --Also,--.
    Line 58, "mark 703" should read --mark 701--.
    Line 67, "Also" should read --Also,--.

COLUMN 3

Line 20, "placed," should read --placed--.
    Line 27, "functions unit 1" should read --scanner unit 1--.
    Line 62, "Also" should read --Also,--.

COLUMN 4

Line 16, "supplied" should read --supplied to--.
    Line 18, "amount" should read --amount,--.
    Line 60, "scanning belt 34." should read --scanning belt 42.--.

COLUMN 5

Line 15, "black K" should read --black BK--.
    Line 33, "head 37." should read --head 37 is performed.--.

UNITED STATES PATENT AND TRADEMARK OFFICE
CERTIFICATE OF CORRECTION

PATENT NO. : 5,023,728

DATED : June 11, 1991

INVENTOR(S) : MITSUO NIMURA, ET AL.

It is certified that error appears in the above-identified patent and that said Letters Patent is hereby corrected as shown below:

COLUMN 6

Line 7, "moded" should read --moved--.
    Line 14, "etc. based" should read --etc. are set based--.

COLUMN 8

Line 20, "obtain" should read --obtained--.

Line 28, ""   " key" should read --" ♗ " key--.
    Line 41, "Also" should read --Also,--.
    Line 54, "Also" should read --Also,--.
    Line 62, "Also" should read --Also,--.

COLUMN 9

Line 50, "an enough" should read --a sufficient--.

COLUMN 10

Line 50, "requiring" should read --required--.
    Line 64, "Also" should read --Also,--.
    Line 68, "Also" should read --Also,--.

COLUMN 11

Line 54, "Also" should read --Also,--.

UNITED STATES PATENT AND TRADEMARK OFFICE
CERTIFICATE OF CORRECTION

PATENT NO. : 5,023,728

DATED : June 11, 1991

INVENTOR(S) : MITSUO NIMURA, ET AL.

It is certified that error appears in the above-identified patent and that said Letters Patent is hereby corrected as shown below:

COLUMN 12

Line 23, "Also" should read --Also,--.

COLUMN 13

Line 29, "maintained" should read --maintained in--.
Line 36, "tointerrupts 492." should read --tointerruptor 492.--.

COLUMN 14

Line 28, "corresponding" should read --corresponding to--.

COLUMN 15

Line 12, "resistors 43, 446" should read --resistors 443, 446--.
Line 21, "diode 435." should read --diode 436.--.

COLUMN 16

Line 9, "flat 531," should read --flag 531,--.
Line 30, "flat 531." should read --flag 531.--.

COLUMN 17

Line 26, "direction" should read --detection--.

UNITED STATES PATENT AND TRADEMARK OFFICE
CERTIFICATE OF CORRECTION

PATENT NO. : 5,023,728

DATED : June 11, 1991

INVENTOR(S) : MITSUO NIMURA, ET AL.

It is certified that error appears in the above-identified patent and that said Letters Patent is hereby corrected as shown below:

COLUMN 18

Line 11, "restart" should read --re-start--.
Line 26, "claim 1," should read --claim 7,--.

Signed and Sealed this

Twentieth Day of April, 1993

Attest:

MICHAEL K. KIRK

*Attesting Officer*       Acting Commissioner of Patents and Trademarks